(12) United States Patent
Machii et al.

(10) Patent No.: US 7,782,179 B2
(45) Date of Patent: Aug. 24, 2010

(54) OBSTACLE DETECTION APPARATUS

(75) Inventors: Kimiyoshi Machii, Novi, MI (US); Mirai Higuchi, Hitachi (JP); Yuji Otsuka, Hitachinaka (JP); Takeshi Shima, Pittsburgh, PA (US); Shoji Muramatsu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 373 days.

(21) Appl. No.: 11/941,259

(22) Filed: Nov. 16, 2007

(65) Prior Publication Data

US 2008/0136612 A1 Jun. 12, 2008

(30) Foreign Application Priority Data

Nov. 16, 2006 (JP) ............................. 2006-309784

(51) Int. Cl.
*B60Q 1/00* (2006.01)
(52) U.S. Cl. ..................... 340/435; 340/436; 340/937
(58) Field of Classification Search ................ 340/435, 340/436, 933, 935, 937, 901, 903; 382/104, 382/284, 285; 348/115, 118, 148
See application file for complete search history.

(56) References Cited

U.S. PATENT DOCUMENTS

| | | | |
|---|---|---|---|
| 6,593,960 B1 * | 7/2003 | Sugimoto et al. | 348/148 |
| 7,266,219 B2 * | 9/2007 | Okamoto et al. | 348/148 |
| 7,378,947 B2 * | 5/2008 | Daura Luna et al. | 340/435 |
| 7,418,372 B2 * | 8/2008 | Nishira et al. | 703/2 |
| 7,557,691 B2 * | 7/2009 | Iwama | 340/435 |
| 2005/0128061 A1 * | 6/2005 | Yanai | 340/435 |

FOREIGN PATENT DOCUMENTS

JP  11-321495 A  11/1999

* cited by examiner

*Primary Examiner*—Van T. Trieu
(74) *Attorney, Agent, or Firm*—Crowell & Moring LLP

(57) ABSTRACT

An obstacle detection apparatus more accurately detects a moving obstacle present around a motor vehicle. With this system, desired feature quantities of an obstacle present in a coverage of a first sensor are calculated and then stored into a storage device, and when the obstacle moves from the coverage of the first sensor to a coverage of a second sensor, a relative distance to the obstacle is calculated from the above-stored feature quantities of the obstacle and from the desired feature quantities of the obstacle, obtained by analyzing the recognition results of the second sensor that have been processed by a processor which processes the recognition results.

11 Claims, 25 Drawing Sheets

FIG.21

| ITEM | | | No. OF BYTES |
|---|---|---|---|
| NUMBER OF VEHICLES | | | 1 |
| VEHICLE INFORMATION | ID | | 1 |
| | VEHICLE WIDTH INFORMATION | VEHICLE WIDTH | 2 |
| | | FEATURE TO BE USED | 1 |
| | RELATIVE POSITION | x | 4 |
| | | z | 4 |
| | DETECTION TIME | YEAR | 2 |
| | | MONTH | 1 |
| | | DAY | 1 |
| | | HOUR | 1 |
| | | MINUTE | 1 |
| | | SECOND | 1 |
| | RELATIVE SPEED | | 2 |
| | RELATIVE DISTANCE | | 2 |
| | VEHICLE WIDTH IN IMAGE | | 2 |
| ... | | | |

FIG.23
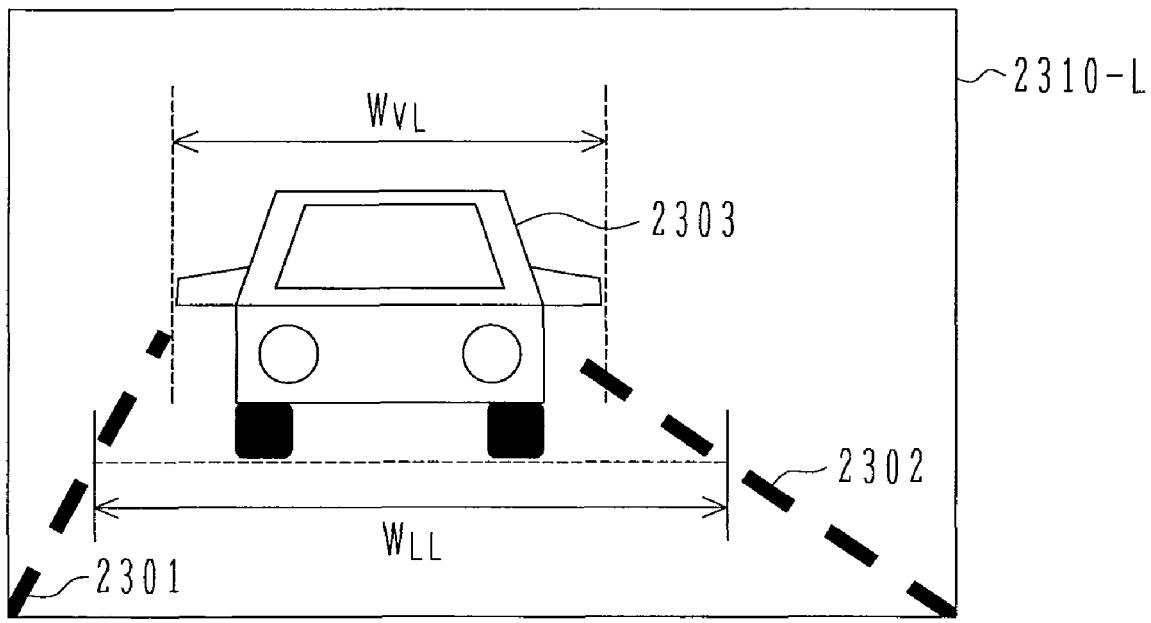
LEFT IMAGE
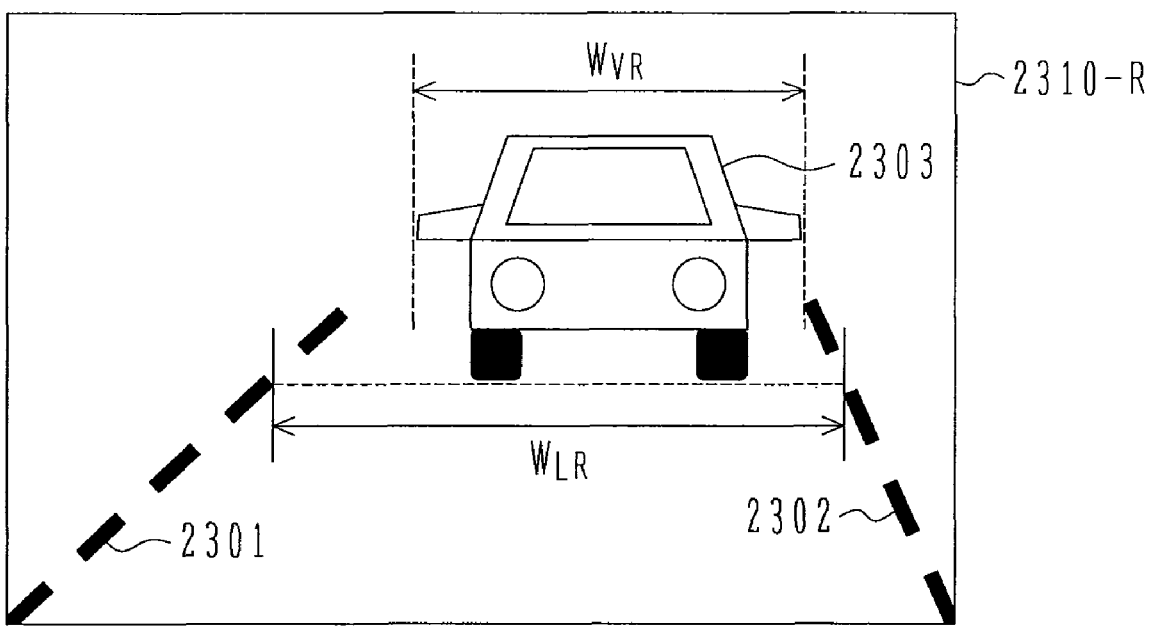
RIGHT IMAGE

OBSTACLE DETECTION APPARATUS

BACKGROUND OF THE INVENTION

1. Field of the Invention

The present invention relates to an obstacle detection apparatus.

2. Description of the Related Art

The development of the technology for ensuring safety for a motor vehicle driver by mounting various sensors in and on the vehicle and monitoring its periphery is in active progress. Such technology includes, for example, the adaptive cruise control (ACC) intended to maintain a safe distance between an own vehicle and the immediately preceding vehicle by using a radar installed at the front position of the host vehicle. The development of a lane departure alarm for alarming the driver against a departure of the host vehicle from the lane by recognizing the lane marking via a stereo camera installed at the front position of the vehicle is also making progress. In addition, the development of automobile safety devices such as a front obstacle monitoring device is progressing.

Known technology other than front monitoring, proposed in JP-A-11-321495, for example, is intended to detect an approaching vehicle from peripheral angles of the host vehicle by use of cameras installed at the rear middle, rear right quarter, and rear left quarter positions of the host vehicle. The detection is conducted by selecting the appropriate camera according to the particular position of a turn signal switch and processing an image acquired by the selected camera. The potential hazard levels of vehicle collisions are judged in accordance with an optical flow of the detected vehicle image. The image acquired by either the rear middle camera when the turn signal switch is off, the rear right quarter camera when the switch is set to the 'right' position, or the rear left quarter camera when the switch is set to the 'left' position, is processed to monitor for an approaching vehicle.

SUMMARY OF THE INVENTION

To monitor the periphery of the host vehicle and ensure safety, it is necessary to detect obstacles around the host vehicle and estimate how close the obstacles to the vehicle is. Before changing lanes, in particular, it is necessary for the driver to view the side mirrors and visually confirm the safety of the rear left quarter or the rear right quarter. During high-speed driving, however, these confirming operations are dangerous since the driver's line of vision moves, or the driver is likely to inadvertently overlook vehicles that may be approaching from a rear-quarter direction. Additionally, the side mirrors have a blind spot and cannot reflect vehicles present in the blind spot. Furthermore, the conventional technology outlined above has a problem in that potential hazard levels cannot be judged without a relative movement of the immediately following vehicle.

With the above in view, the present invention is intended to detect obstacles present around a host vehicle accurately.

The present invention calculates required feature quantities of a moving obstacle present in a coverage of a first sensor, and stores the calculated feature quantities into a storage device. In addition, when the obstacle moves from the coverage of the first sensor to a coverage of a second sensor, the invention calculates a relative distance from a vehicle to the obstacle. This calculation is based on the feature quantities of the obstacle that have been stored in the storage device, and on required feature quantities of the obstacle that have been derived by analyzing recognition results obtained by the second sensor and processed by a processing unit which processes the recognition results.

The present invention makes it possible to provide a motor vehicle safer than one achievable using the conventional technology outlined above.

BRIEF DESCRIPTION OF THE DRAWINGS

FIG. 21 shows a structure of data included in the rear host vehicle lane data 308, rear passing lane data 309, and rear-quarter passing lane data 310 of FIG. 3;

FIG. 23 shows an example of images acquired by the stereo camera unit 101;

DESCRIPTION OF THE PREFERRED EMBODIMENTS

Hereunder, an embodiment will be described referring to the accompanying drawings. The present embodiment is intended to detect automobiles, motorcycles, and other obstacles approaching a host vehicle when the host vehicle is traveling on a road.

Figure 1:
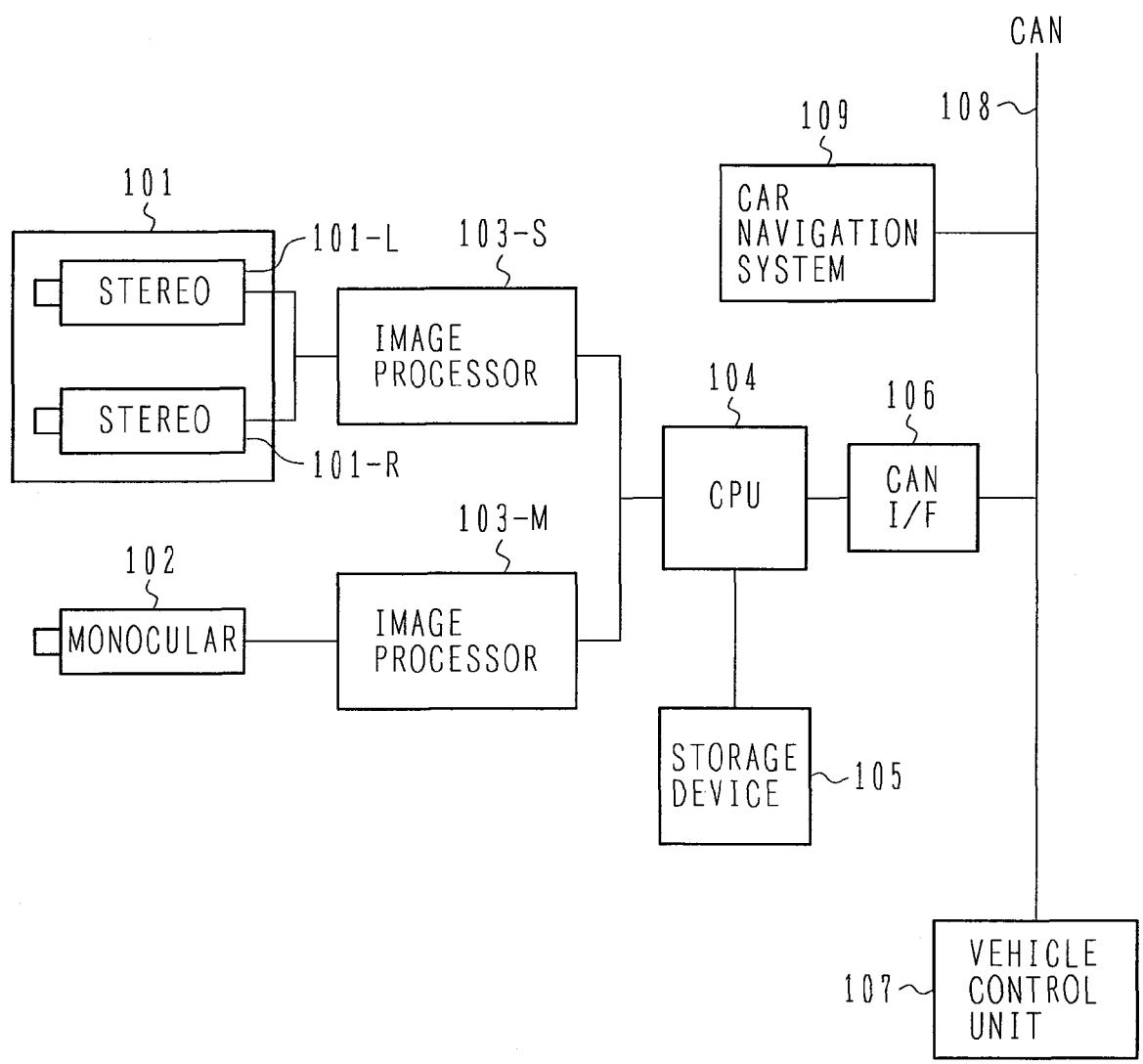
FIG. 1 is a block diagram showing an example of an obstacle detection system.

FIG. 1 is a block diagram of an obstacle detection system. Images acquired by a stereo camera unit 101 which monitors rear areas of the host vehicle are processed by an image processor 103-S and then input to a CPU 104. Also, an image acquired by a monocular camera 102 which monitors a rear-quarter side of the host vehicle is processed by an image processor 103-M and then input to the CPU 104. The CPU 104 uses processing results by the image processors 103-S and 103-M to arrange information of an approaching vehicle into a database and store the information into a storage device 105. After this, the CPU 104 places the foregoing vehicle information on a CAN bus 108 through a CAN interface 106 and transmits the information to a vehicle control unit 107 connected to the CAN bus 108. A car navigation system 109 with internally prestored map information is also connected to the CAN bus 108 and can deliver information of the host vehicle, map information, and the like to the CAN bus 108.

Independent signal input sections (not shown) for receiving input signals from the stereo camera unit 101 and the monocular camera 102 each, the image processors 103-S and 103-M, and an obstacle detection unit which includes the CPU 104, the storage device 105, and the CAN interface 106 are shown by way of example in FIG. 1. These constituent elements, however, are not necessarily accommodated in one unit. For example, a camera and an image-processing unit may exist as one unit, from which electrical connection to some kind of control unit including the CPU 104 may be conducted using a signal line. Alternatively, the image processor 103, the CPU 104, and more may be accommodated in the car navigation system 109 or may be housed in the vehicle control unit 107.

Figure 2:
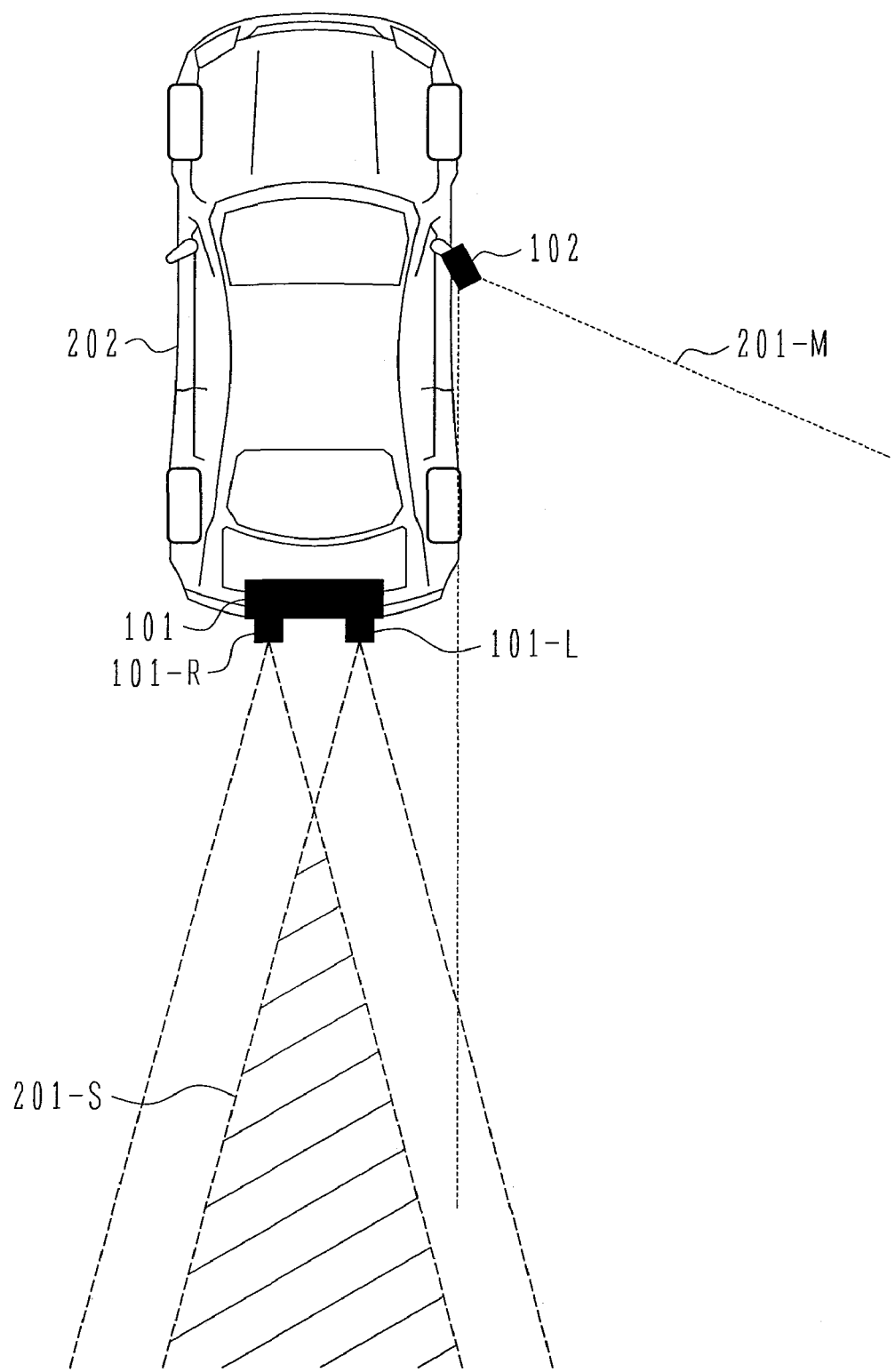
FIG. 2 shows an example of installation locations of a stereo camera unit 101 and monocular camera 102 shown in the example of FIG. 1.

FIG. 2 shows an example of installation locations of the stereo camera unit 101 and monocular camera 102 shown in the example of FIG. 1. The stereo camera unit 101 is installed on a rear bumper to monitor the rear of the host vehicle 202. The monocular camera 102 is installed on a door mirror to monitor a rear-quarter area of the host vehicle. Coverages obtained by such positioning of the stereo and monocular cameras are, for example, areas shown as 201-S and 201-M, respectively. The coverage here may be a viewing angle or field angle of the camera or may be, among the entire viewing angle of the camera, only an area that the image processor can process. The monocular camera 102, however, is desirably installed such that an optical axis thereof will be as remote as possible from the host vehicle 202 to minimize imaging of the vehicle 202. An area that the stereo camera unit 101 can stereoscopically cover is an area in which viewing fields of both cameras 101-L and 101-R overlap, and this area is the coverage denoted as 201-S. The stereo camera unit 101 may be installed inside the vehicle. For example, the camera 101 may be suspended from a ceiling of the host vehicle, above a rear seat, so as to monitor the rear of the vehicle through a rear window, whereby sticking of raindrops, mud, and the like, even on rainy days, can be avoided.

The monocular camera 102 may be replaced by a stereo camera unit (hereinafter, referred to as the rear-quarter stereo camera unit). Using the rear-quarter stereo camera unit makes it possible to calculate width of an approaching vehicle, a relative position of the approaching vehicle and other parameters. Combining these calculation results with results shot by the stereo camera unit 101 to establish data matching makes the above parameters more accurately calculable. Alternatively, the stereo camera unit 101 can be used to detect an approaching vehicle present in the distance, and the rear-quarter stereo camera unit can be used to detect vehicles present within a short distance range of the host vehicle. The stereo camera unit 101 can have great base-line length and is therefore suitable for detecting distant vehicles. The rear-quarter stereo camera unit cannot have great base-line length and is therefore unsuitable for distant vehicle detection, but if spread in field angle to reduce a detection distance, the stereo camera unit becomes an effective unit for detecting vehicles present within a short distance range of the host vehicle.

Figure 3:
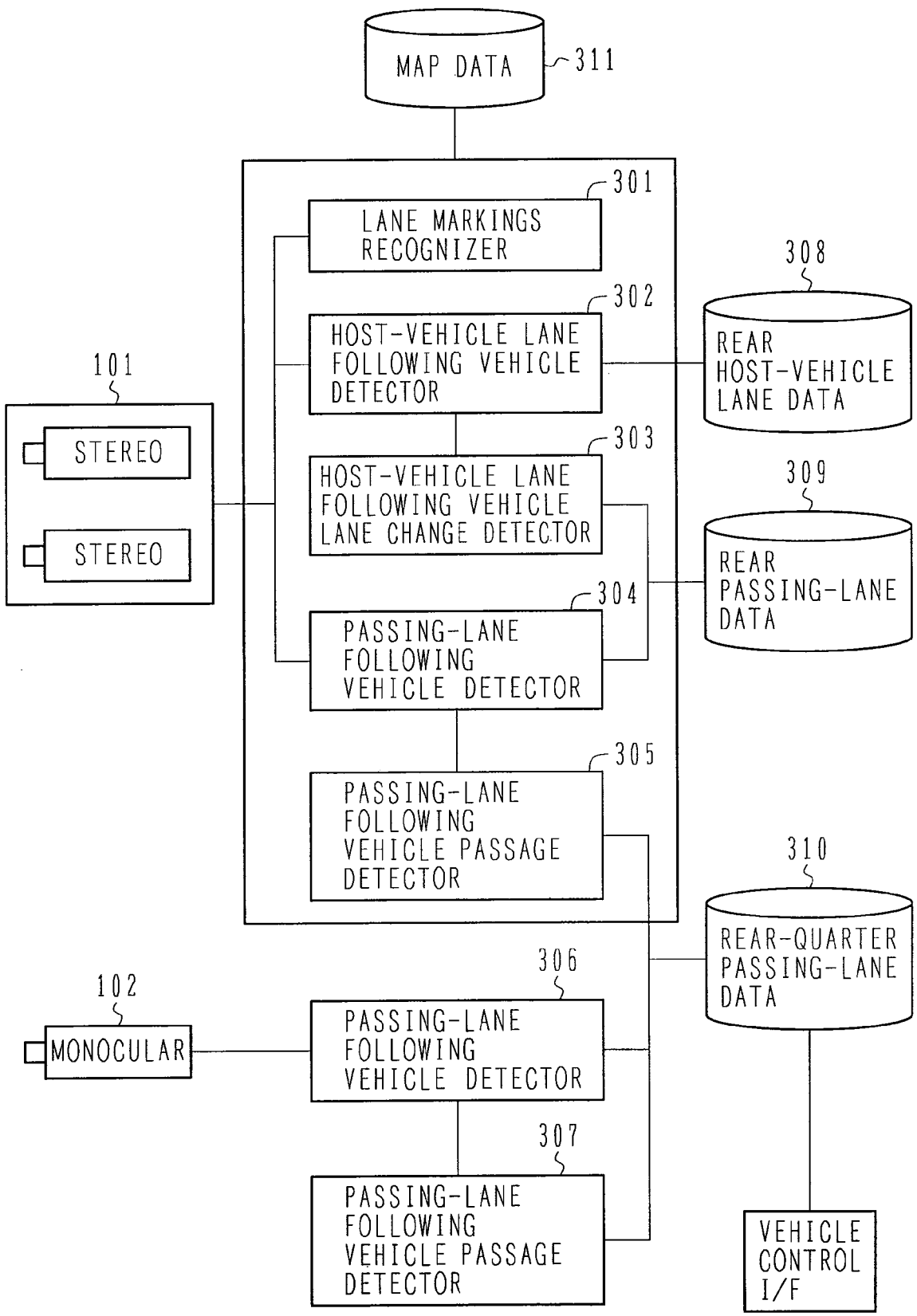
FIG. 3 is a block diagram of software in the example of FIG. 1.

FIG. 3 is a block diagram of software in the example of FIG. 1. Processing that concerns the stereo camera unit 101 is undertaken by a lane markings recognizer 301, a host vehicle lane following vehicle detector 302, a host vehicle lane following vehicle lane change detector 303, a passing-lane following vehicle detector 304, and a passing-lane following vehicle passage detector 305.

The lane markings recognizer 301 recognizes existence of on-road traffic lane markings (indicative of lane boundaries) at the rear of the host vehicle. Lane markings recognition results are used as an aid for identifying a lane in which vehicles are running at the rear of the host vehicle. The lane markings recognition can use various existing recognition logic.

The host vehicle lane following vehicle detector 302 detects the vehicles running at the rear of the host vehicle. Information on the detected vehicles is next registered in rear host vehicle lane data 308.

In accordance with the recognition results from the lane markings recognizer 301 and detection results from the host vehicle lane following vehicle detector 302, the host vehicle lane following vehicle lane change detector 303 judges whether any following vehicles are changing lanes or have changed lanes. Judgments are conducted particularly on whether any vehicles detected by the host vehicle lane following vehicle detector 302 are changing lanes. If any lane changes are detected, information on corresponding vehicles is added to rear passing lane data 309 and stored information on the corresponding vehicles is deleted from the rear host vehicle lane data 308.

The passing-lane following vehicle detector 304 detects any vehicles running in the passing lane. The detection also allows for the results obtained by the lane markings recognizer 301. Information on the vehicles which have been detected by the passing-lane following vehicle detector 304 is registered in the rear passing lane data 309.

The passing-lane following vehicle passage detector 305 judges whether the front vehicle of all running vehicles in the passing lane (fast lane) that are being detected by the stereo camera unit 101 has passed by and disappeared from the viewing field of the stereo camera unit 101. If the front vehicle is judged to have disappeared, immediately previous detection results on the particular vehicle are registered in rear-quarter passing lane data 310.

A passing-lane following vehicle detector 306 detects the vehicles that the monocular camera 102 is imaging. Information on the detected vehicles is registered in the rear-quarter passing lane data 310.

A passing-lane following vehicle passage detector 307 judges whether the vehicles imaged by the monocular camera 102 have passed by and disappeared from the viewing field of the monocular camera 102. Vehicle data that has been registered in the rear-quarter passing lane data 310 is sent to a vehicle control interface and used for vehicle control and warning. When the monocular camera 102 is imaging a vehicle, that is, when a vehicle is approaching from the passing lane, the vehicle control side refers to the data registered in the rear-quarter passing lane data 310 and determines the kind of control to be conducted.

At least the width and relative speed of the detected vehicle, a relative position of the detected vehicle to the host vehicle, and detection time of the day are registered in the rear host vehicle lane data 308, the rear passing lane data 309, and the rear-quarter passing lane data 310. A distance from the host vehicle may be registered instead of the relative position of the host vehicle.

Map data 311 is retained in the car navigation system 109. The map data 311 includes information such as shapes of roads, the number of lanes, and width of each lane, and the map data makes it possible to obtain appropriate information according to a particular position of the host vehicle during image processing of the stereo camera unit 101.

FIG. 21 shows a structure of the data included in the rear host vehicle lane data 308, rear passing lane data 309, and rear-quarter passing lane data 310 of FIG. 3. Each kind of data is formed up of the number of vehicles, 2101, and the number of sets of vehicle information 2102 that is expressed by the number of vehicles, 2101. The vehicle information 2102 is formed up of ID 2103, vehicle width 2104, relative position 2105, detection time 2106, relative speed 2107, relative distance 2108, and vehicle width 2109 in an image. The vehicle width 2104 is calculated from image-processing results, whereas the vehicle width 2109 in the image is a data size expressed in the number of dots.

Not only a distance between longitudinal edges of the vehicle, but also a distance between headlights, windshield width, or any other characteristic pattern of the vehicle can be used as the vehicle width information. It is preferable, however, that what kinds of features have been used to calculate the vehicle width should be stored. This can be accomplished by storing the above features together with the vehicle information into the rear host vehicle lane data 308, the rear passing lane data 309, and the rear-quarter passing lane data 310 beforehand. For this reason, the features are registered as attributes of the vehicle width information 2104.

The vehicle information 2102 is stored in ascending order of relative distance, that is, in ascending order of the distance from the host vehicle, in the rear host vehicle lane data 308, the rear passing lane data 309, and the rear-quarter passing lane data 310.

While various information such as the vehicle width and the relative position is shown by way of example in FIG. 21, not all of these kinds of information need to be stored and the kinds and number of parameters stored will change according to the kind of obstacle detected by the obstacle detection system. Only a portion of the parameters shown in FIG. 21 may be stored or all of the parameters may be stored.

Figure 4:
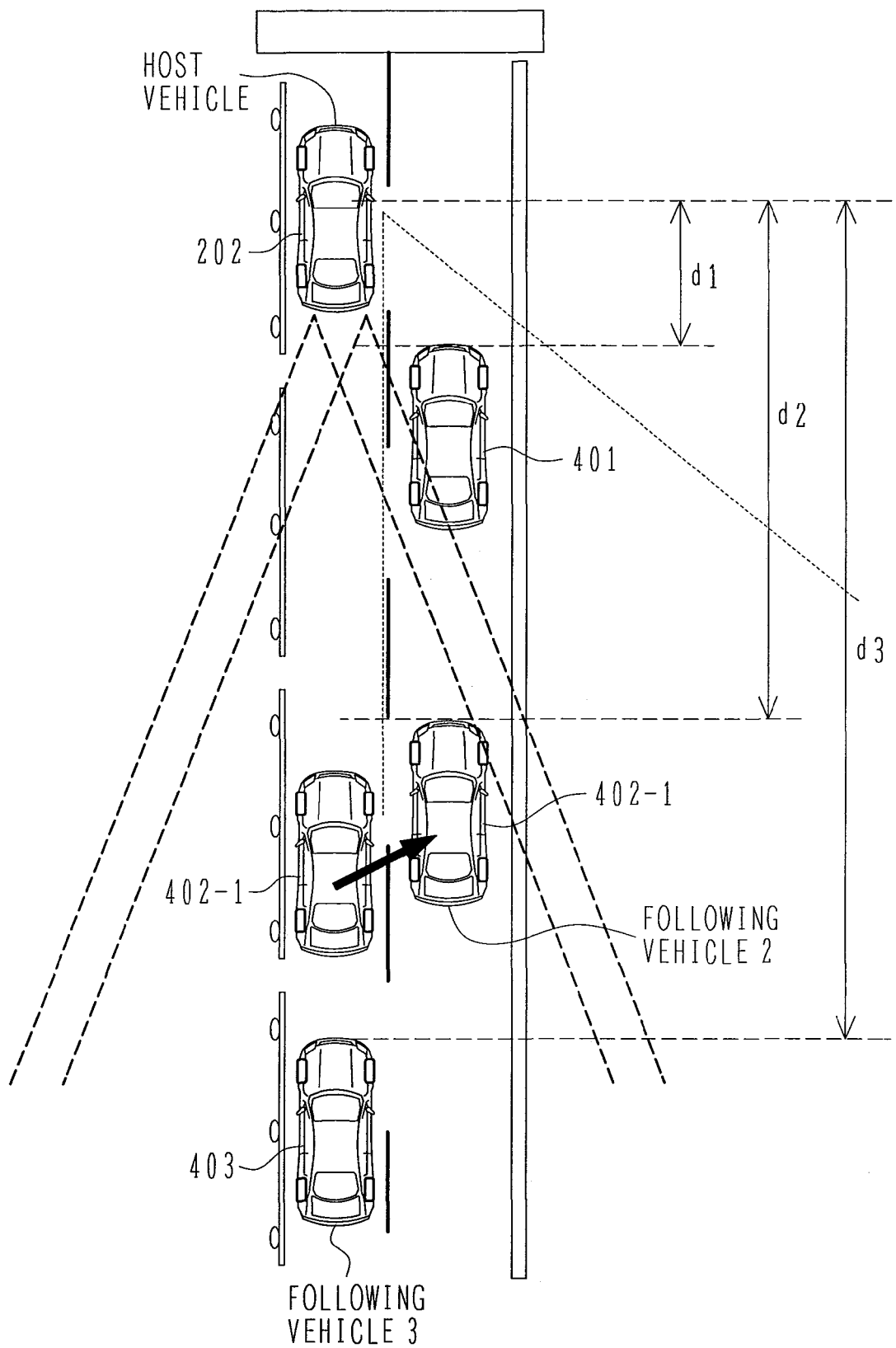
FIG. 4 is an explanatory diagram of operation in FIG. 3.

FIG. 4 is an operational explanatory diagram of FIG. 3. The monocular camera 102 acquires an image of a vehicle 401, and information on the vehicle 401 is registered in the rear-quarter passing lane data 310. The information registered at this time is at least a relative speed and relative position between the vehicle 401 and the host vehicle 202, and detection time of the vehicle 401. A distance "d1" from the host vehicle to the vehicle 401 may be registered instead of the relative position. Vehicle width information of the vehicle 401 registered in the rear-quarter passing lane data 310 is used during calculation of the distance "d1". The width of the corresponding vehicle that was calculated when the vehicle was present in the coverages of the stereo camera unit 101 is used as the vehicle width information.

Suppose that a vehicle 402 running at the rear of the host vehicle changes lanes to move to a position 402-2. At this time, the stereo camera unit 101 images the lane change of the vehicle 402. Also, information on the vehicle 402 is registered in the rear passing lane data 309.

Suppose that as a result of the above lane change, a vehicle 403 running at the rear of the vehicle 402 enters the coverages of the stereo camera unit 101. At this time, information on the vehicle 403 is registered in the rear host vehicle lane data 308.

If a plurality of vehicles are detected by the monocular camera 102, information on each of the vehicles is registered in the rear-quarter passing lane data 310.

Figure 5:
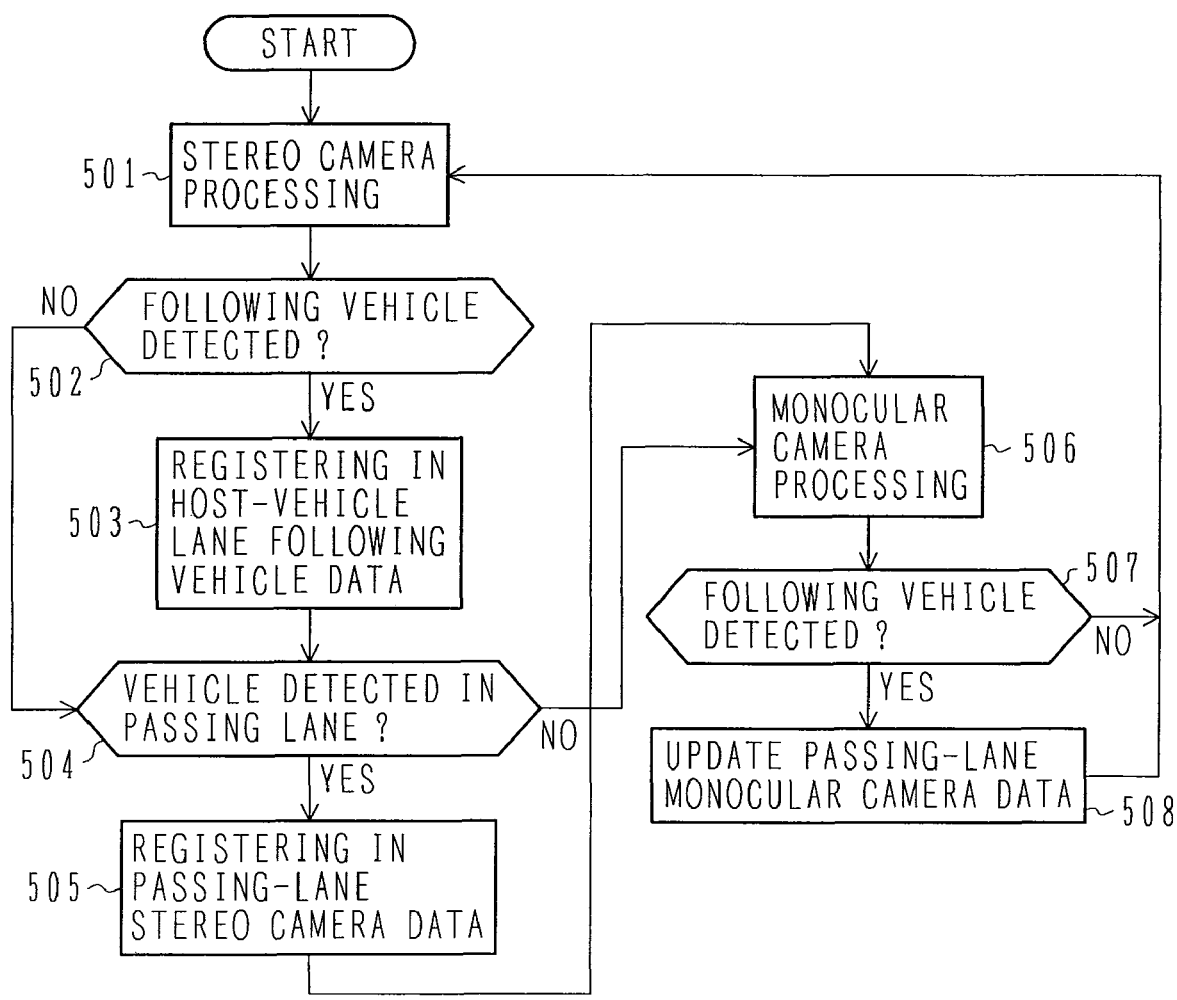
FIG. 5 shows a process flow of the example of FIG. 1.

FIG. 5 is a process flow diagram of the system shown by way of example in FIG. 1. First in step 501, the stereo camera unit 101 conducts image processing and attempts detecting a vehicle immediately following the host vehicle. Whether the immediately following vehicle exists is judged in step 502, and if the immediately following vehicle is detected, information on this vehicle is registered in the rear host vehicle lane data 308 in step 503. Next in step 504, the stereo camera unit 101 further conducts image processing and judges whether a vehicle exists in the passing lane. If a vehicle is present in the passing lane, information on this vehicle is registered in the rear passing lane data 309 in step 505. Even when no vehicles exist in the passing lane, if the vehicle immediately following the host vehicle can be regarded as moving to the passing lane, information on that vehicle is registered in the rear passing lane data 309.

Next in step 506, the monocular camera 102 conducts image processing and attempts detecting a vehicle running in the passing lane. Whether a vehicle exists in the passing lane is judged in step 507, and if a passing vehicle is detected, the rear-quarter passing lane data 310 is updated in accordance with information relating to that vehicle.

Figure 6:
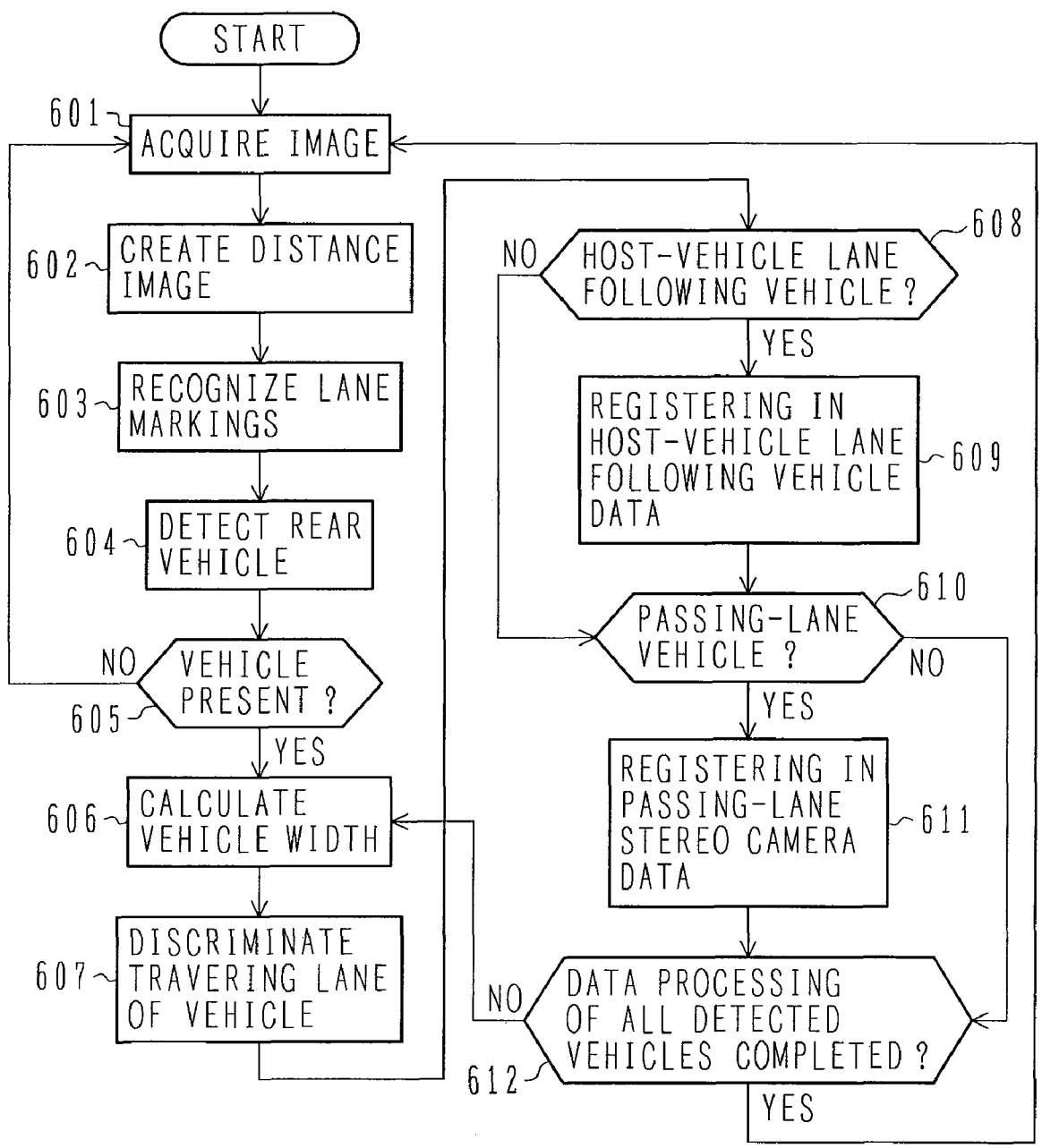
FIG. 6 shows a process flow diagram of the stereo camera unit 101 shown in FIG. 1.

FIG. 6 is a process flow diagram of the stereo camera unit 101 of FIG. 1.

First in step 601, images are acquired by both cameras of the stereo camera unit 101. Next in step 602, a distance image is created from the images that have been acquired by both cameras. The creation of the distance image uses parallaxes of both cameras of the stereo camera unit 101. The creation of the distance image, based on the parallaxes, can use existing technology.

Next in step 603, lane markings are recognized using the distance image. An algorithm for recognizing the lane markings can also use existing technology.

Next in step 604, the immediately following vehicle is detected using the distance image. To detect the immediately following vehicle, edge lines substantially equidistant from the stereo camera unit 101 can be detected and the detected edge lines can be handled as the vehicle front. If, in step 605, the vehicle is judged to have been detected, width of the detected vehicle is calculated in step 606. A distance between longitudinal edges of the vehicle can be used to calculate the vehicle width.

Next, in which lane the corresponding vehicle is traveling is judged (step 607). This judgment is based on lane markings recognition results obtained in step 603, and on the detection position of the vehicle on the image. The immediately following vehicle is judged to be traveling in the same lane as that of the host vehicle if the position of the lane marking is seen to the left of a middle section of the vehicle, or the passing lane if the marking is seen to the right of the middle section.

As a result, if, in step 608, the following vehicle is judged to be traveling in the same lane as that of the host vehicle, information on the following vehicle is registered in the rear host vehicle lane data 308 in step 609. If, in step 610, the following vehicle is judged to be present in the passing lane, information on the following vehicle is registered in the rear passing lane data 309 in step 611. These steps are executed for all detected vehicles, and after the execution of these steps for each vehicle has been judged to be completed in final step 612, process control is returned to first step 601. Control is returned to step 606 if any vehicles still remain unprocessed.

Figure 7:
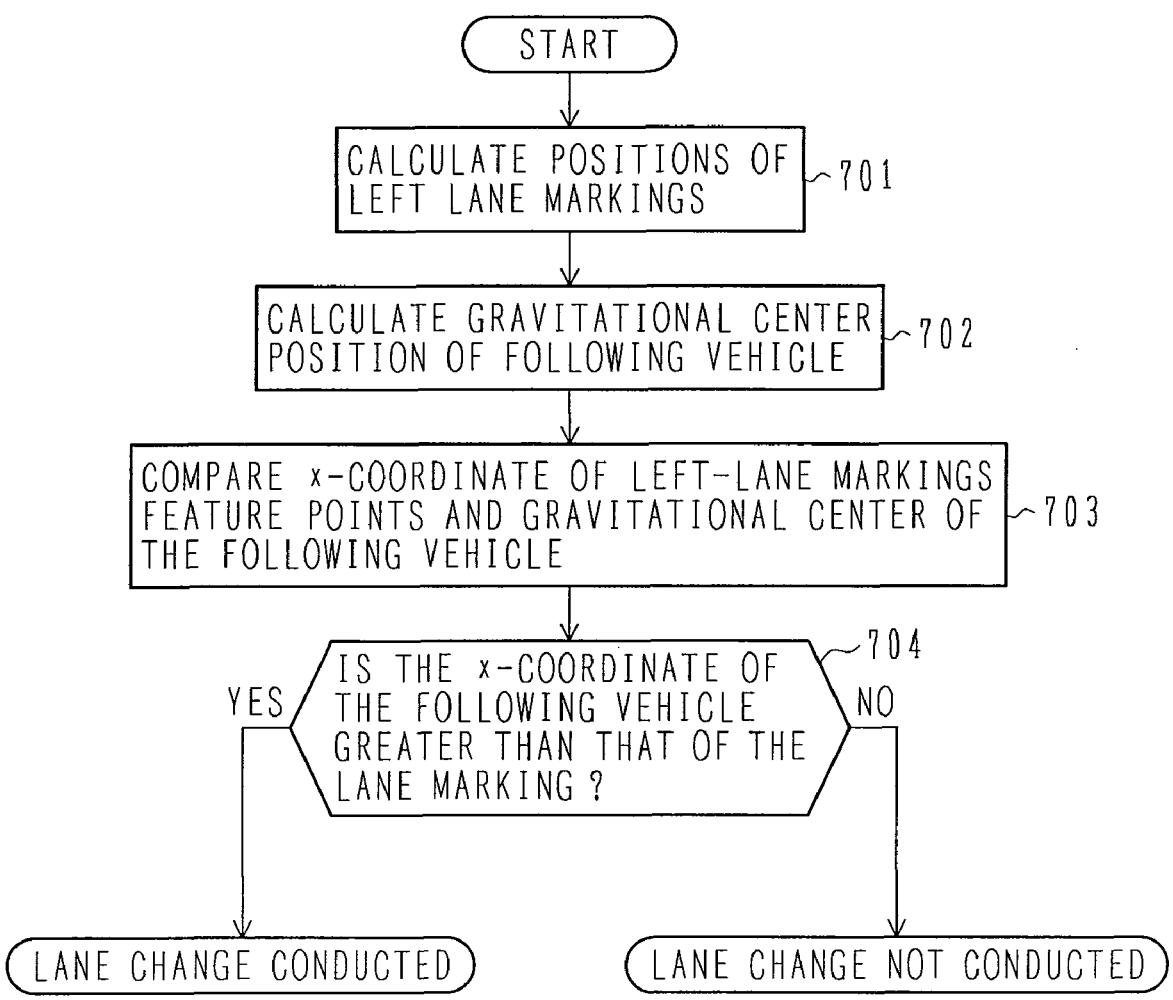
FIG. 7 shows an example of a process flow for judging on a lane change of a following vehicle in the example of FIG. 1.
Figure 8:
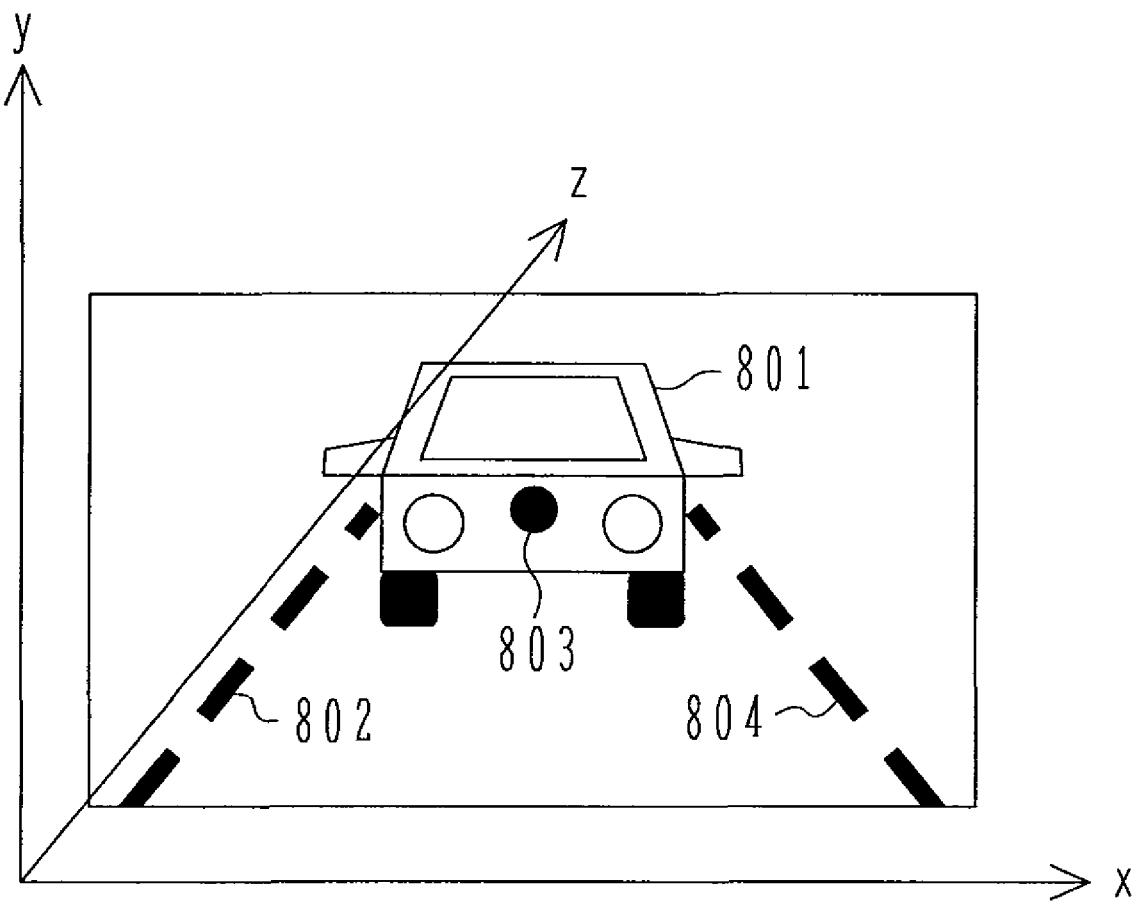
FIG. 8 shows a camera coordinate system established when images are acquired by the stereo camera unit 101 in the example of FIG. 7.

A method of judging whether a following vehicle has changed lanes is described below. FIG. 7 shows an example of a process flow for judging on a lane change of a following vehicle in the example of FIG. 1. FIG. 8 shows a camera coordinate system established when images are acquired by the stereo camera unit 101 in the example of FIG. 7.

First, a position of a lane marking 802 in the left side of the image is detected (step 701). This detection step is included in step 603. The position of the lane marking is defined as an x-coordinate in the camera coordinate system. Next, a position of a gravitational center 803 of an immediately following vehicle 801 is calculated (step 702). The position of the gravitational center 803 is calculated by determining a vehicle area of that vehicle during vehicle recognition and defining the calculated position as a gravitational position of the vehicle area. Alternatively, the position of the gravitational center 803 can likewise be calculated from edges deemed to form a profile of the vehicle. This method can be applied to either two-dimensional processing or stereoscopic processing.

Next, an x-coordinate of the gravitational center 803 and the position of the lane marking 802 are compared (step 703). As a result of a comparative judgment (step 704), if the x-coordinate of the lane marking 802 is greater, the vehicle is judged to have changed lanes. If the x-coordinate of the gravitational center 803 is greater, the vehicle is judged not to have changed lanes.

Figure 13:
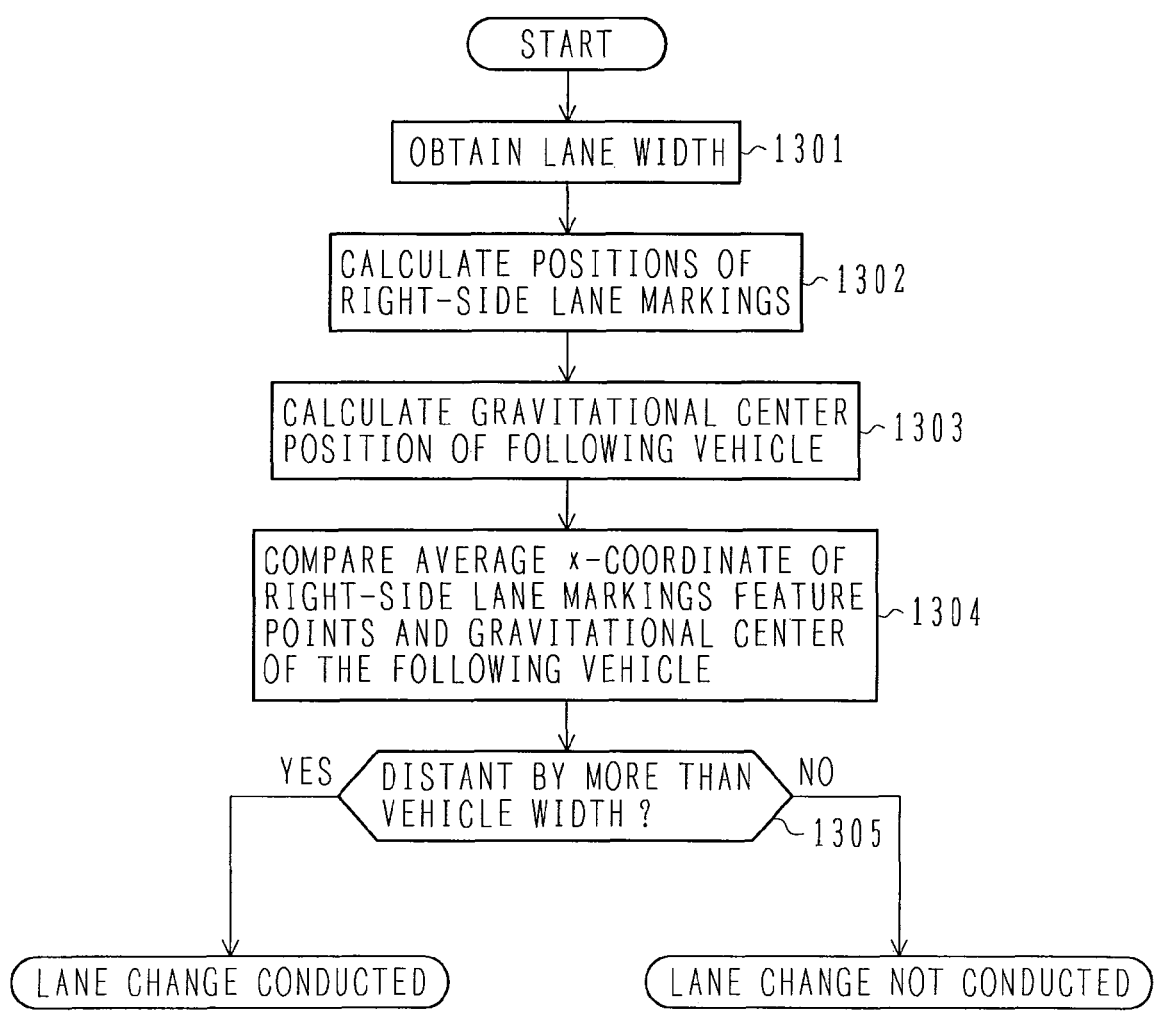
FIG. 13 shows a process flow applied if left lane markings recognition fails.

If the recognition of the lane marking 802 fails, recognition results on the lane marking 804 are used. Associated process flow is shown in FIG. 13. First, lane width of the road on which the host vehicle is running is obtained from the car navigation system 109 (step 1301). Next, a lane marking 804 is recognized (step 1302) and a gravitational position of an immediately following vehicle is calculated (step 1303). Step 1303 is a process step equivalent to step 702. Next, an average x-coordinate of various feature points of a right-side lane marking and an x-coordinate of the gravitational position of the immediately following vehicle are compared (step 1304). Whether the two values differ by the lane width or more is judged (step 1305). If the difference between the two values is equal to or greater than the lane width, the following vehicle is regarded as have changed lanes. If the difference is less than the lane width, the following vehicle is regarded as not have changed lanes.

Figure 9:
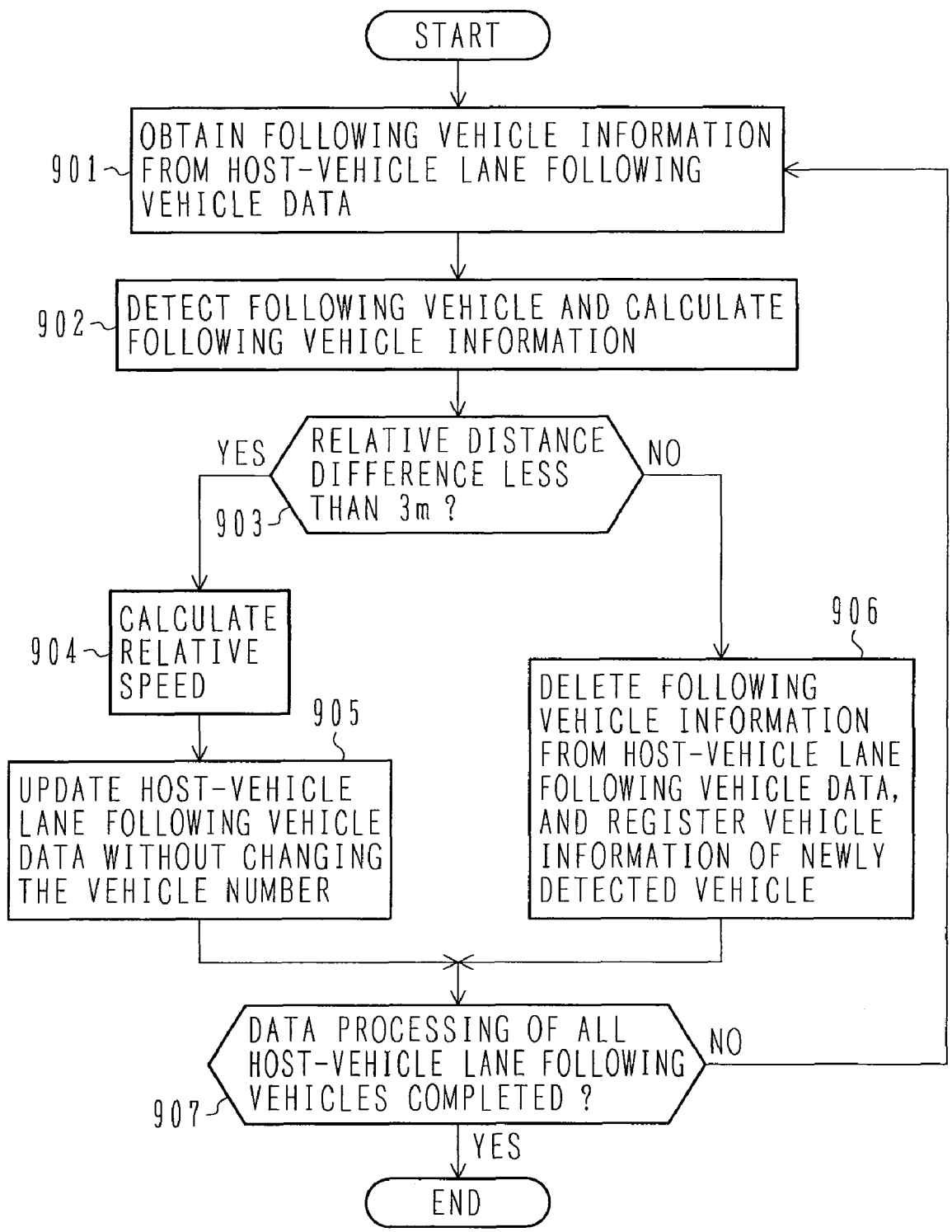
FIG. 9 shows a process flow of registering vehicle information relating to a vehicle detected by the stereo camera unit 101 in FIG. 5 in rear host vehicle lane data 308.

FIG. 9 shows the process flow of registering in the rear host vehicle lane data 308 the vehicle information relating to the vehicle detected by the stereo camera unit 101 in FIG. 5. Calculating a relative speed of the detected vehicle requires acquiring a relative differential distance and a detection time interval by repeating the detection of the vehicle at least two times. It is therefore necessary to judge whether the detected vehicle is the same as the vehicle last detected. The flow in FIG. 9 can also be applied to a case in which a plurality of vehicles are detected by the stereo camera unit 101. Actual imaging by the stereo camera unit 101 depends on installation height thereof. However, the stereo camera unit 101 can detect, among all following vehicles traveling in the lane of the host vehicle, only the vehicle traveling at immediate rear of the host vehicle. Only vehicle information on the vehicle traveling at immediate rear of the host vehicle, therefore, is usually registered in the rear host vehicle lane data 308.

First, information on a following vehicle is obtained from the rear host vehicle lane data 308 (step 901). Next, the stereo camera unit 101 attempts detecting the following vehicle (step 902). Step 902 is a process step equivalent to step 604. After the vehicle detection, width of the vehicle and a relative distance thereto are calculated. The calculated relative distance and a relative distance obtained from the rear host vehicle lane data 308 are compared (step 903). If the distance is up to 3 m, the vehicle is regarded as the same vehicle as that last detected, and the relative distance is calculated (step 904). Finally, information on the following vehicle, such as the relative distance, relative speed, and vehicle width, is registered in the rear host vehicle lane data 308. An identification number of the particular following vehicle remains unchanged. After step 907 has been further executed to confirm whether information on other vehicles is registered in the rear host vehicle lane data 308, if registered information on other vehicles exists, control is returned to step 901 to execute like processing of the corresponding vehicle information.

If the relative differential distance in step 903 is more than 3 m, the detected vehicle is regarded as a vehicle different from that last detected. Data that was obtained in step 901 is consequently given away from the rear host vehicle lane data 308, a new vehicle number is assigned, and vehicle information on the corresponding vehicle, such as the relative distance, relative speed, and vehicle width, are registered in the rear host vehicle lane data 308.

Vehicle identification can use pattern recognition, not the relative differential distance mentioned above. A vehicle pattern image that the stereo camera unit 101 has acquired is registered in the rear host vehicle lane data 308. During next image acquisition, a vehicle pattern obtained from the new image, and the vehicle pattern last registered in the rear host vehicle lane data 308 are compared by pattern matching to judge a degree of similarity between both patterns.

Substantially the same process flow as that of FIG. 9 also applies to the vehicles that are traveling in the passing lane. As a vehicle traveling in the passing lane approaches the host vehicle, that traveling vehicle will soon or later disappear from the field of the stereo camera unit 101. At that time, if the distance from the corresponding vehicle to the vehicle traveling at immediate rear of that vehicle is in excess of 3 m, a relative differential distance obtained during the judgment in step 903 will be more than 3 m. As a result, information on the vehicle that has disappeared from the field of the stereo camera unit 101 will be given away from the rear passing lane data 309 and the information relating to the vehicle immediately following the corresponding vehicle will remain registered. This means that whether the vehicle has gone out from the field of the stereo camera unit 101 is judged from a change in the distance from the stereo camera unit 101 to the vehicle most distant therefrom.

Figure 12:
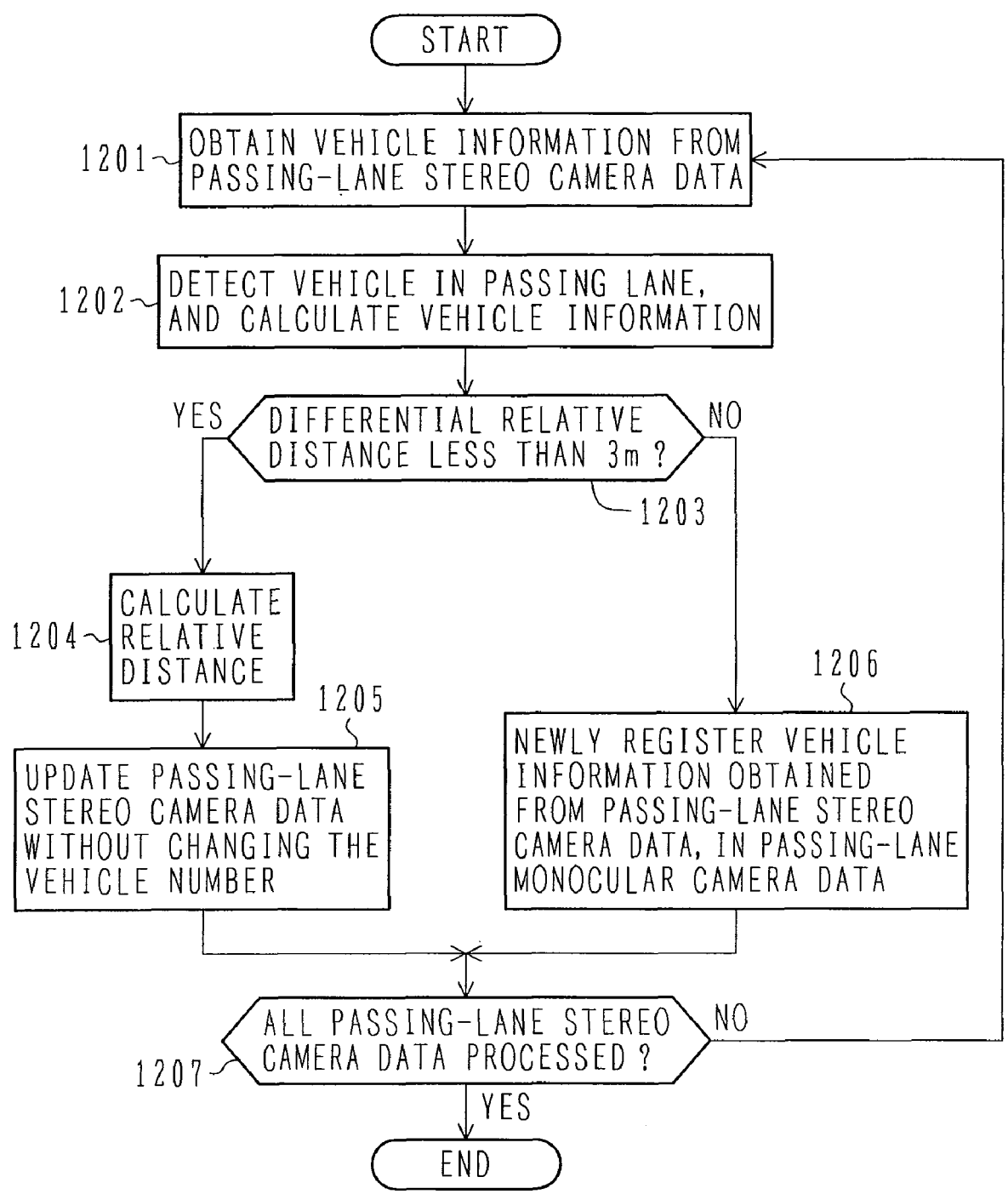
FIG. 12 shows a process flow for judging whether the vehicle disappeared from a field of the stereo camera unit 101 in FIG. 9.

FIG. 12 shows a process flow for judging whether the vehicle disappeared from the field of the stereo camera unit 101 in FIG. 9. First in step 1201, information on a following vehicle is obtained from the rear host vehicle lane data 308. Next, the stereo camera unit 101 attempts detecting the following vehicle (step 1202). Step 1202 is a process step equivalent to step 604. After the vehicle detection, width of the vehicle and a relative distance thereto are calculated. The calculated relative distance and a relative distance obtained from the rear host vehicle lane data 308 are compared (step 1203). If the distance is up to 3 m, the vehicle is regarded as the same vehicle as that last detected, and the relative distance is calculated (step 1204). Finally, information on the following vehicle, such as the relative distance, relative speed, and vehicle width, is registered in the rear passing lane data 309. An identification number of the particular following vehicle remains unchanged. After step 1207 has been further executed to confirm whether information on other vehicles is registered in the rear passing lane data 309, if registered information on other vehicles exists, control is returned to step 1201 to execute like processing of the corresponding vehicle information.

If the relative differential distance in step 1203 is more than 3 m, the detected vehicle is regarded as a vehicle different from that last detected. Data that was obtained in step 1201 is consequently given away from the rear passing lane data 309. The data, after being discarded from the rear passing lane data 309, is registered in the rear-quarter passing lane data 310 (step 1206). When the data is discarded, however, since the vehicle has disappeared from the field of the stereo camera unit 101, the relative distance to the corresponding vehicle and the relative speed with respect thereto are incalculable by image processing. Accordingly, the data existing immediately before the above discarding operation is conducted is registered in the rear-quarter passing lane data 310, but during the registration, information on the time when the corresponding information was calculated is appended.

The relative differential distance described above is a value determined assuming that the vehicle imaged approaches the host vehicle by about 3 m at a relative speed of 100 km/h and at image-processing time intervals of 100 ms. The relative differential distance, therefore, is a value determined by the relative speed and image-processing time intervals that the system assumes, and the value of 3 m is merely an example.

Figure 10:
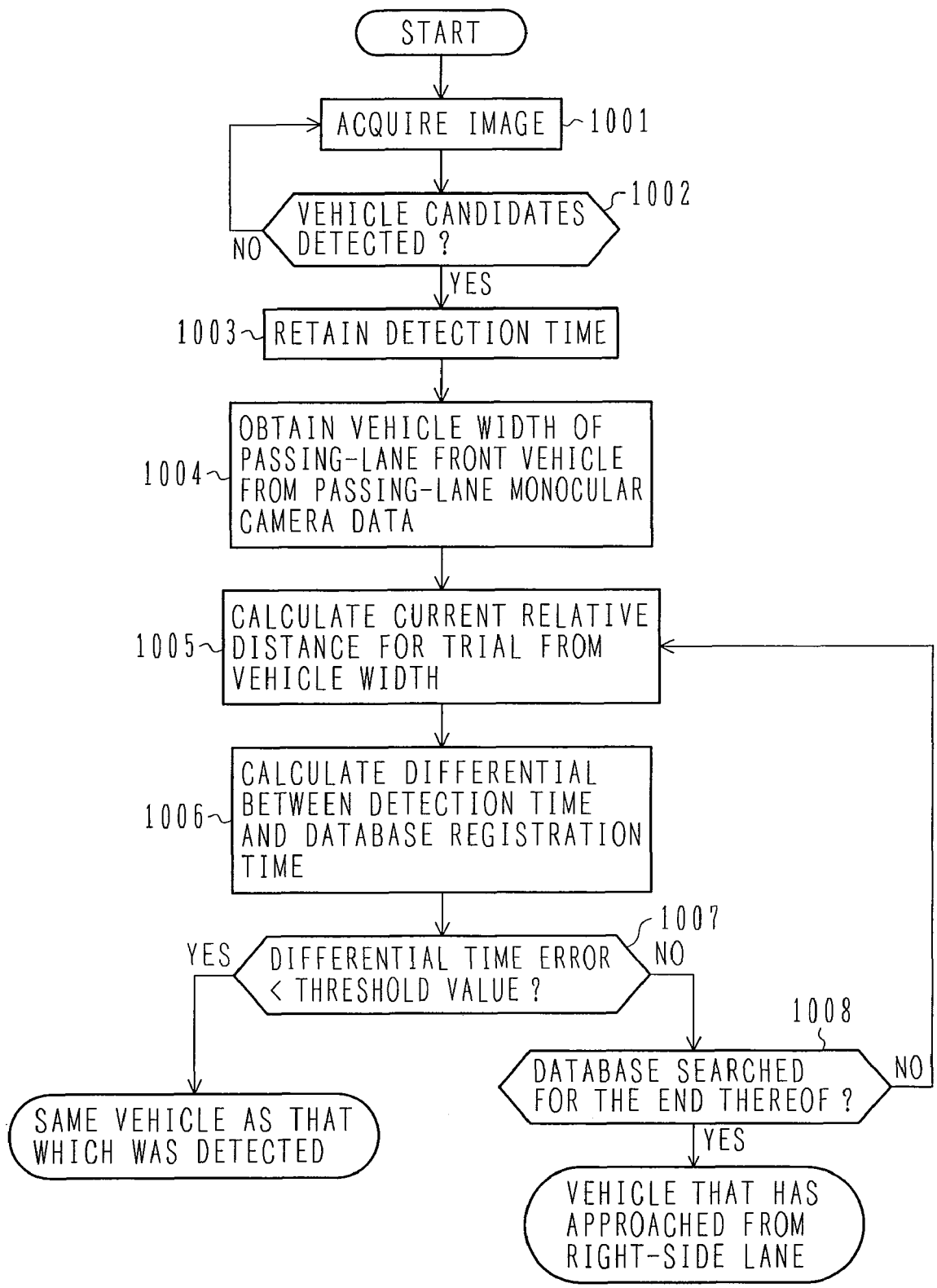
FIG. 10 is a process flow diagram of the monocular camera 102.

FIG. 10 is a process flow diagram of the monocular camera 102. First, an image is acquired in step 1001 and whether candidate patterns likely to become vehicle patterns are present in the image is judged in step 1002. If candidates are present, detection time of each candidate pattern is retained in step 1003 and vehicle width information on each vehicle is acquired from the rear-quarter passing lane data 310 in order of the distance from the host vehicle in step 1004. More specifically, vehicle width information on nearer vehicles is acquired earlier.

Next, it is judged whether the information that has been acquired from the rear-quarter passing lane data 310 relates to a vehicle candidate that the monocular camera 102 has detected. For this judgment, the distance to that detected vehicle is calculated in step 1005 using the vehicle width information acquired from the rear-quarter passing lane data 310. A differential between the detection time and the time when the relative distance was registered in the rear-quarter passing lane data 310 is calculated from the above-calculated distance in step 1006. The calculation of the differential time uses following expression (1):

Detection time−Registration time=(Registered relative distance−Calculated relative distance)/Registered relative distance (1)

This differential is compared with a threshold value in step 1007, and if the differential is less than the threshold value, the detected vehicle candidate and the vehicle registered in the rear-quarter passing lane data 310 are regarded as the same vehicle, and consequently, data on the vehicle registered in the rear-quarter passing lane data 310 is updated. Using this method makes it possible, even if the vehicle stays outside the coverages of the stereo camera unit 101 or the monocular camera 102, to measure the relative distance by using vehicle width information when the vehicle enters the coverage of the monocular camera 102.

If the differential is equal to or greater than the threshold value, the next vehicle information registered in the rear-quarter passing lane data 310 is processed similarly to the above. If there is not a vehicle less than the threshold value in terms of the differential between the detection time and the time when the vehicle information was registered in the rear-quarter passing lane data 310, the detected vehicle candidate is regarded as a vehicle that has approached from the lane located to the further right of the passing lane when viewed from the host vehicle. That is, the detected vehicle is a vehicle not registered in the rear-quarter passing lane data 310.

When the road on which the host vehicle is currently traveling is known to have two lanes only, the detection of the vehicle candidate may be regarded as due to a recognition error, or the detection may be due to a shift in the installation position or angle of the monocular camera 102. In this latter case, parameters of the camera require re-setting.

If the width of a moving obstacle is defined as W, a focal distance of the camera as "f", the distance to the obstacle as "d", and the width of the obstacle in an image as $\Delta x$, the following relationship is established between the four parameters:

$$d = \frac{f \cdot W}{\Delta x} \quad (2)$$

If a direction of the camera is changed by $\theta$, W in expression (2) is replaced by $W \cos \theta$ and the following expression holds:

$$d = \frac{f \cdot W \cos \theta}{\Delta x} \quad (3)$$

Figure 22:
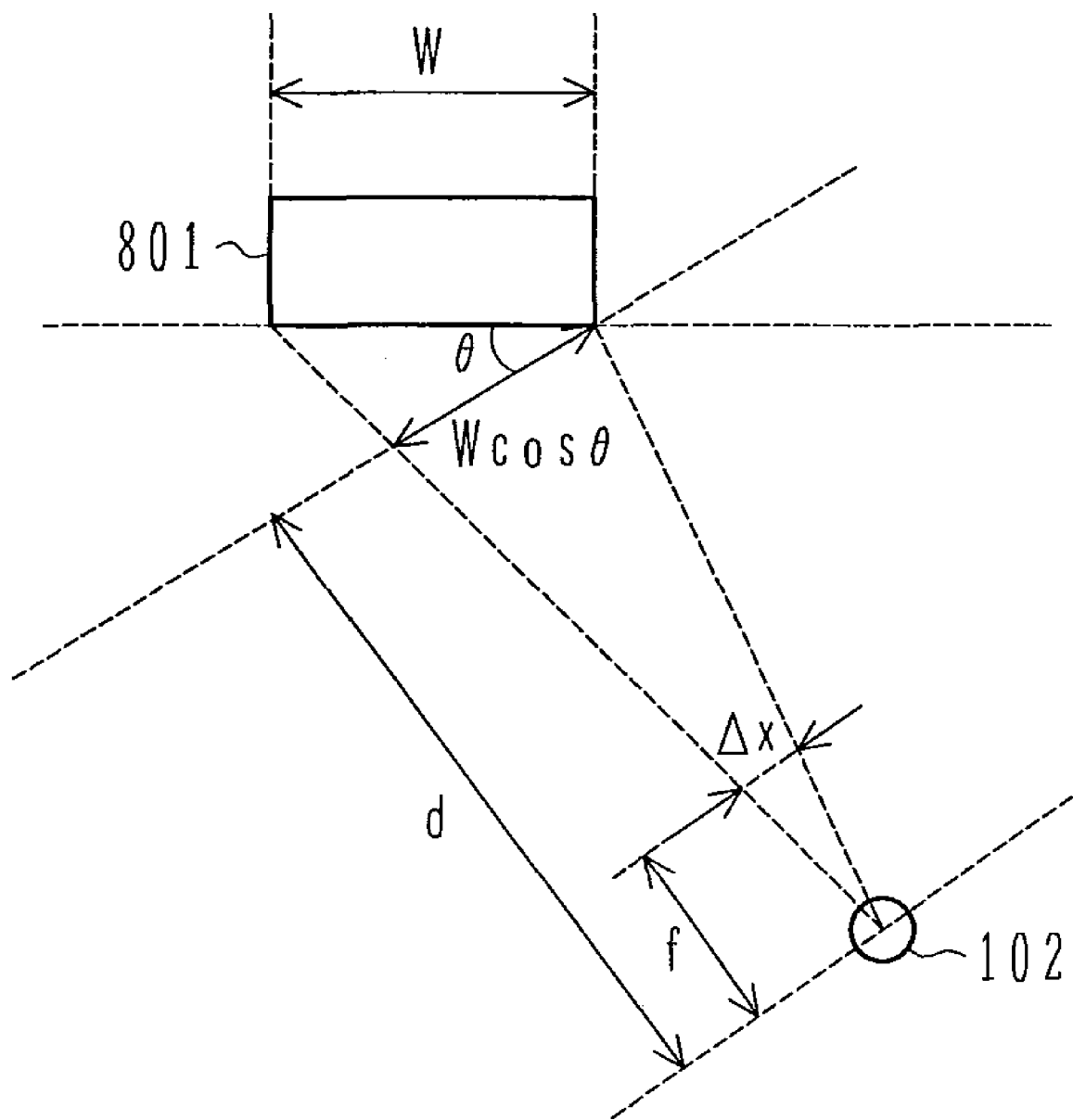
FIG. 22 shows a relationship between a direction of the rear-quarter monitoring monocular camera and the detected vehicle.

FIG. 22 shows the way the monocular camera 102 changed in angle $\theta$ acquires an image of a vehicle 801. If the width of the vehicle in the image is $\Delta x$, the angle $\theta$ of the camera can be calculated from W by using the rear-quarter passing lane data 310.

How the vehicle that has approached from the lane located to the further right of the passing lane when viewed from the host vehicle is handled in the system is described below. The corresponding vehicle has entered the coverage of the monocular camera 102 without passing through the coverages of the stereo camera unit 101, so the vehicle width is unknown. Even in this case, the relative distance can be calculated by estimating the vehicle width from the vehicle width data of the vehicle which has passed through the coverages of the stereo camera unit 101 and the monocular camera 102.

Figure 11:
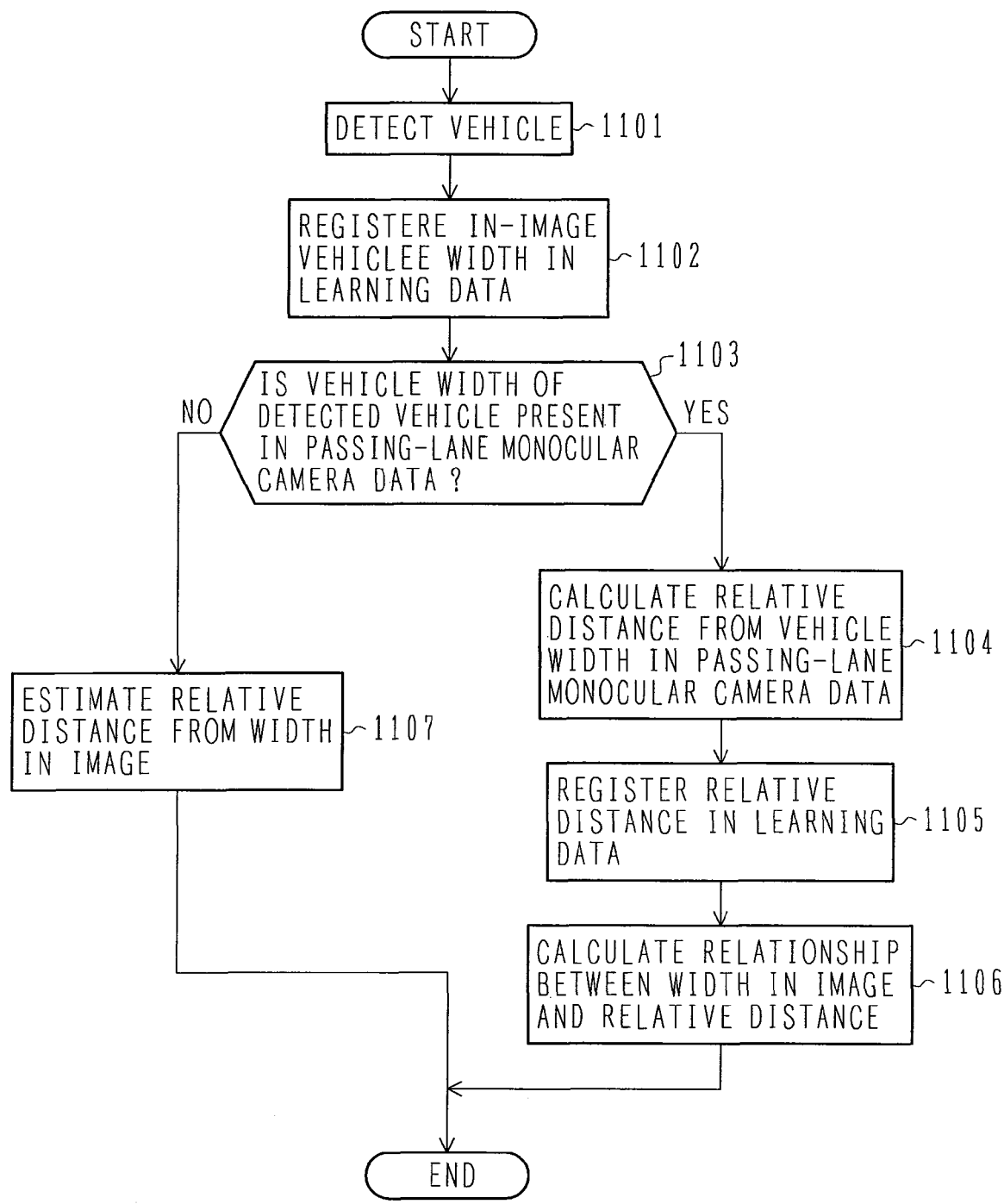
FIG. 11 shows a process flow for making the system learn a relationship between width of the vehicle in an image and a relative distance of a detected vehicle to the host vehicle during the image acquisition.

FIG. 11 shows a process flow for making the system learn the relationship between the vehicle width in an image and the relative distance detected during the image acquisition. After vehicle detection in step 1101, the vehicle width in the image is registered in learning data (not shown) in step 1102. Next, whether the vehicle width data relating to the detected vehicle exists in the rear-quarter passing lane data 310 is confirmed in step 1103. The confirmation is executable during the process flowcharted in FIG. 10. If the vehicle width data is present, the relative distance is calculated in step 1104 using the width data. This calculation is executable during the process flowcharted in FIG. 10. Next, the vehicle width in the image is registered in the learning data in step 1105. Finally, the relationship between the vehicle width and relative distance in the image is derived in step 1106. This relationship can be derived by calculating with the least-square method the relationship between the vehicle width and relative distance registered in the learning data, and calculating a ratio between the vehicle width and relative distance in the image.

If the vehicle width of the detected vehicle is absent in the rear-quarter passing lane data 310, the above-calculated ratio between the vehicle width and relative distance in the image can be used to estimate the relative distance in step 1107.

Figure 14:
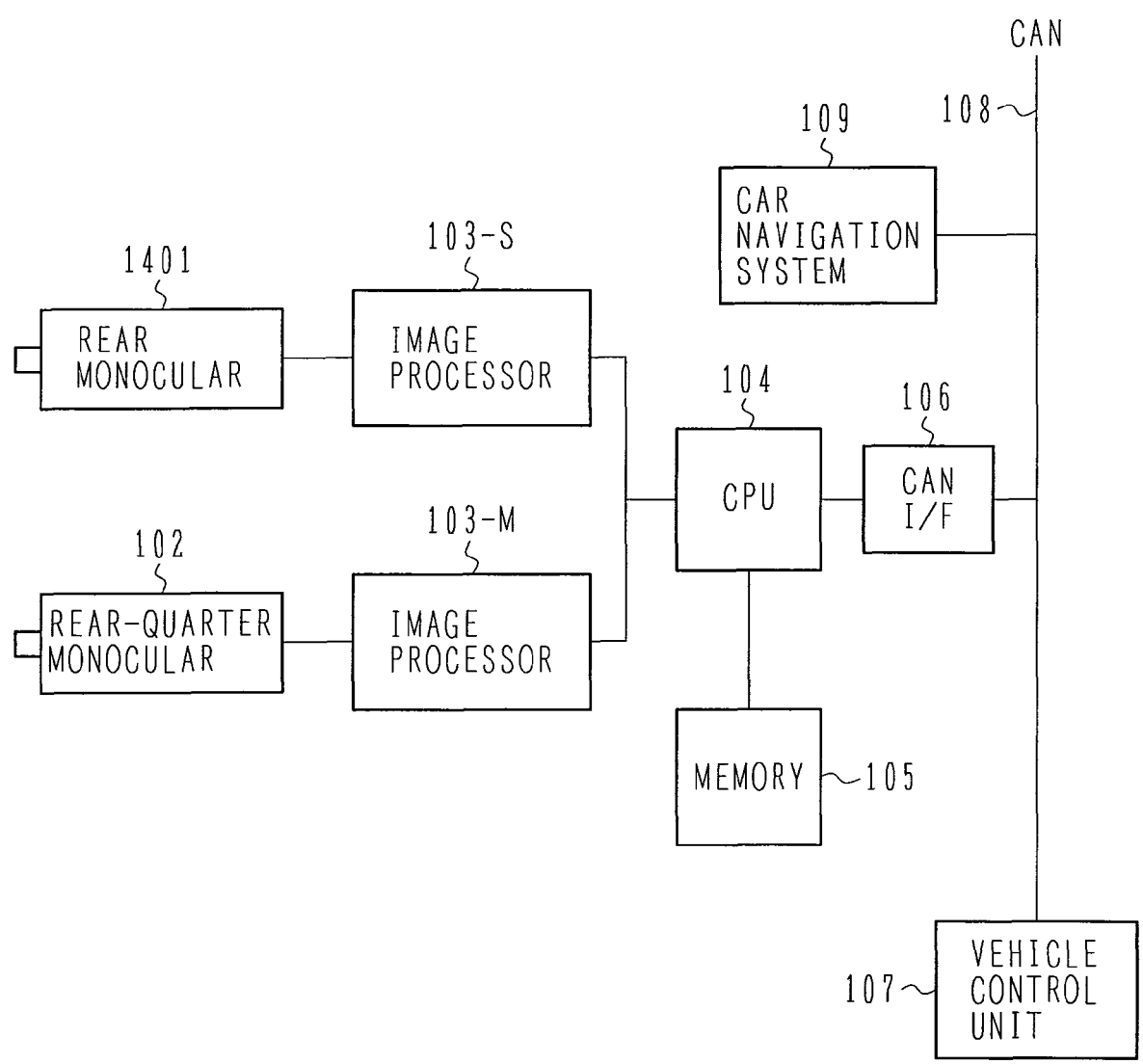
FIG. 14 shows a system configuration with a monocular camera installed for rear monitoring.

Next, an example of installing a monocular camera for rear monitoring, instead of the stereo camera unit 101, is described below. FIG. 14 shows a system configuration implemented in the particular example. This system configuration, compared with that of FIG. 1, differs only in that the stereo camera unit 101 is substituted by the monocular camera 1401, and is the same in other terms.

Figure 15:
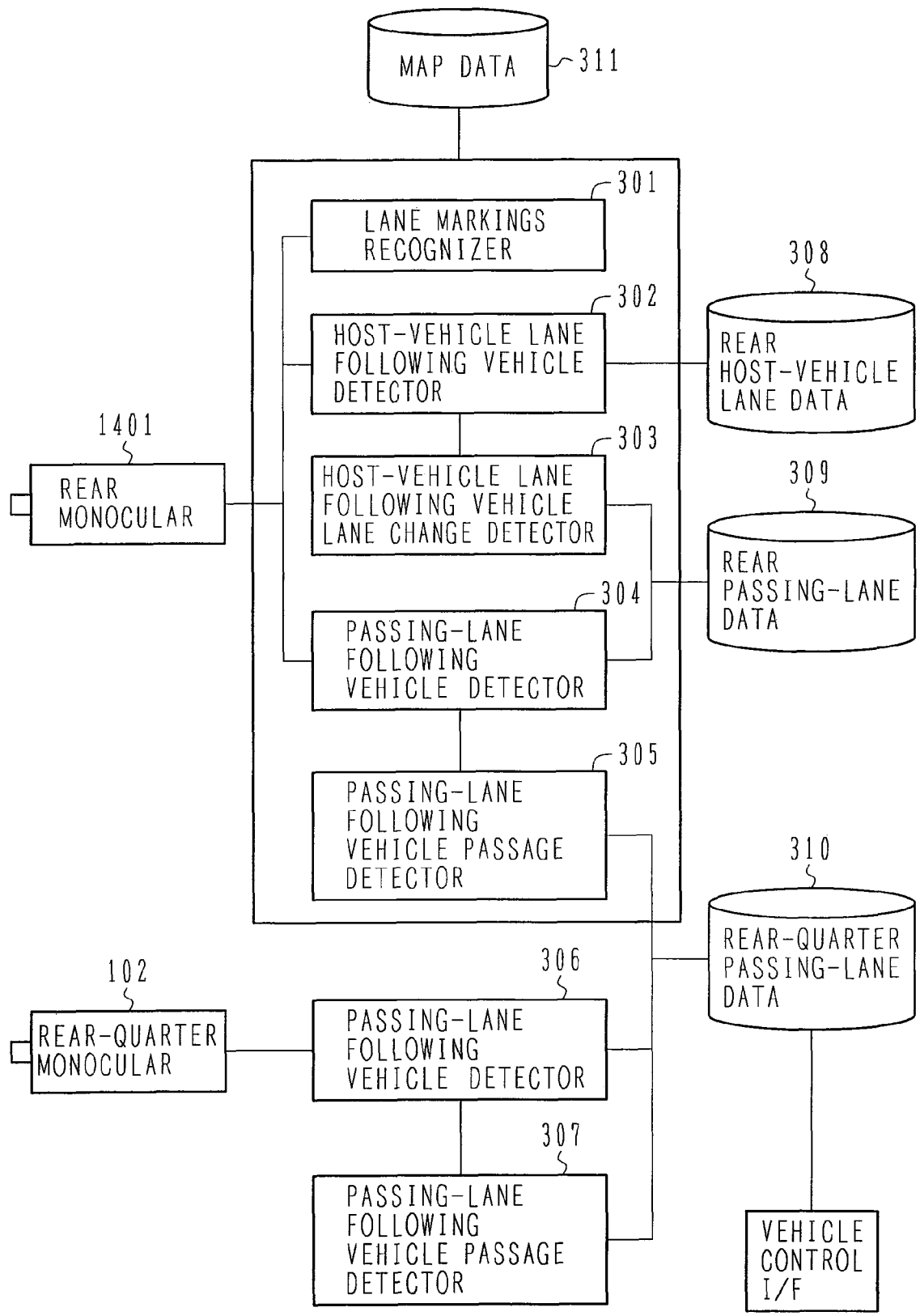
FIG. 15 shows a software configuration with the monocular camera installed for rear monitoring.

FIG. 15 shows a software configuration. This configuration, compared with that of FIG. 3, differs only in that the stereo camera unit 101 is substituted by the monocular camera 1401, and is the same in other terms.

When the monocular camera is used for rear monitoring, calculating the vehicle width of a vehicle which follows the host vehicle differs in process. This is described below with reference being made to FIGS. 16 and 17.

First, an image is acquired in step 1601. Next, lane markings are recognized in step 1602 and the vehicle 1703 is detected in step 1603. At this time, whether the vehicle has been detected at the rear of the host vehicle lane is judged in step 1604 and if the vehicle has been detected, process control proceeds to next step.

If the vehicle has been detected, the width of the lane in which the host vehicle is currently traveling is obtained from the car navigation system 109 in step 1605. Alternatively, if the road is an expressway, since the lane width is predetermined (e.g., 3.5 m) according to the particular standards of the road, information on the type of road on which the host vehicle is traveling may be obtained and the lane width estimated in step 1609.

Next, left and right edges of the vehicle are detected and the edge-to-edge width of the vehicle in the image, $W_V$, is calculated in step 1606. This is followed by detecting an edge of the lowermost section of the vehicle in step 1607 and then in step 1608, detecting intersections between the edge and the lane markings 1701 and 1702. After the detection of the intersections, a distance between the intersections, WL, is calculated and the vehicle width is calculated from a ratio between WL and the lane width (step 1609).

For example, if the lane width is 3.5 m, since a relationship of WL: 3.5=WV: vehicle width, it follows that vehicle width=3.5×WV/WL. The vehicle width can thus be calculated. Subsequent process steps are the same as the process steps described above. In this way, even when the monocular camera is used for rear monitoring, substantially the same advantageous effects can be obtained by calculating the vehicle width from the lane width.

This can be applied to implement calibration and self-diagnosis of the stereo camera unit 101. An example of images acquired by the stereo camera unit 101 is shown in FIG. 23. Image 2310-L is the image acquired by the camera 101-L, and image 2310-R is the image acquired by the camera 101-R. Compared with a position of vehicle 2303 in the image 2310-L, a position of the vehicle in the image 2310-R is slightly shifted upward. During stereo matching, if the images match in vertical position, the matching point can be detected just by searching in a transverse direction, and as a result, a processing time can be correspondingly reduced. Even if such images as in FIG. 23 are obtained, therefore, it is appropriate to correct the shift in vertical position between the images.

Figure 16:
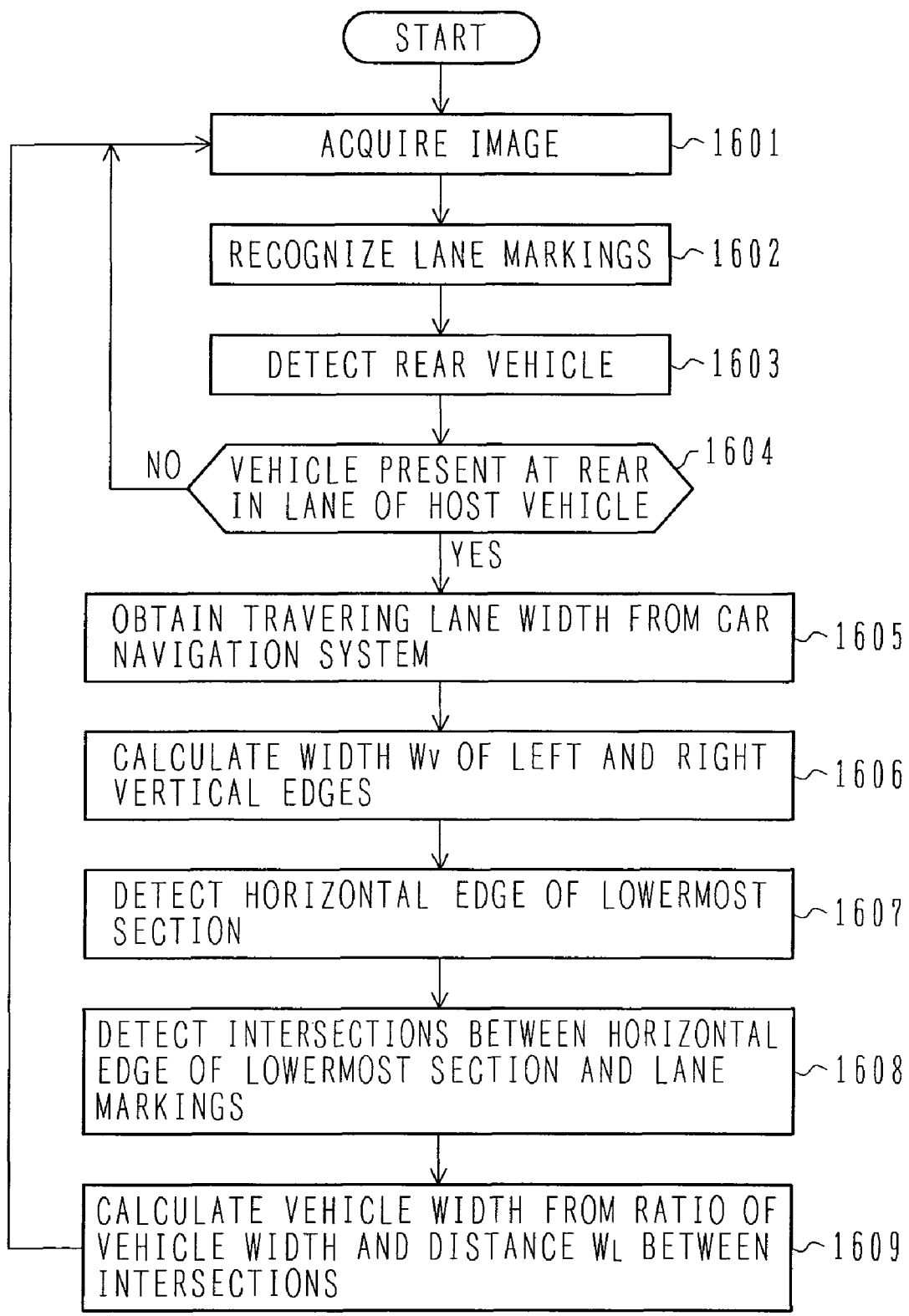
FIG. 16 shows a process flow applied during use of the monocular camera installed for rear monitoring.
Figure 17:
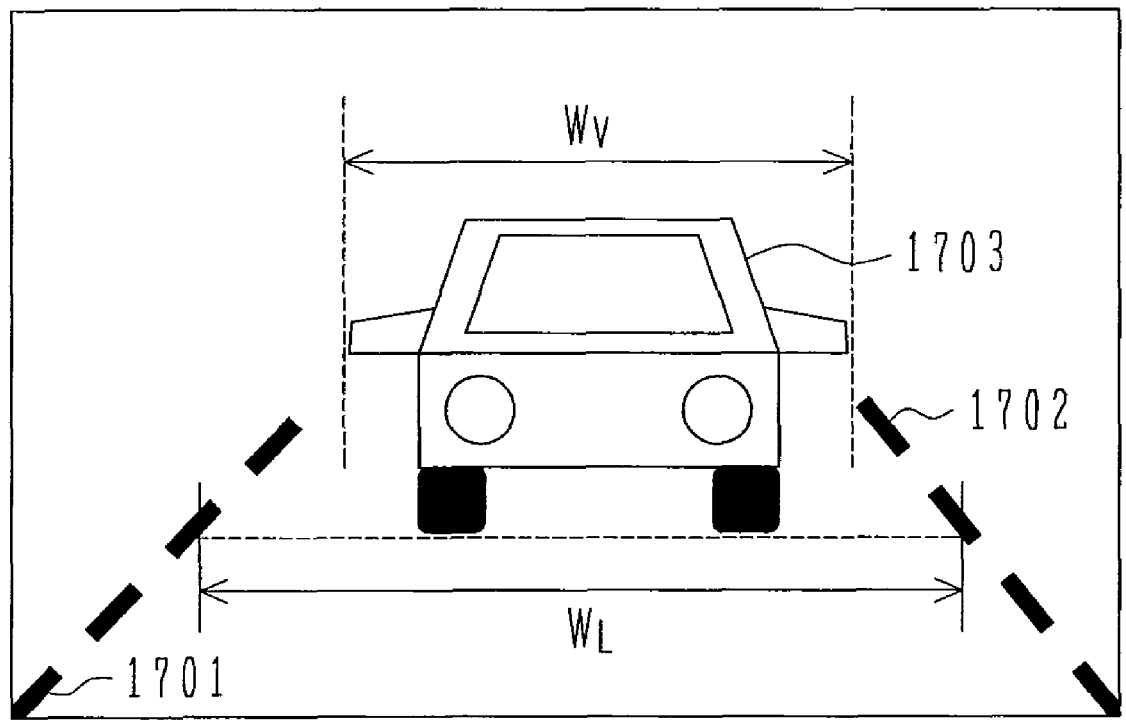
FIG. 17 is a schematic diagram of an image obtained from the camera for rear monitoring.
Figure 24:
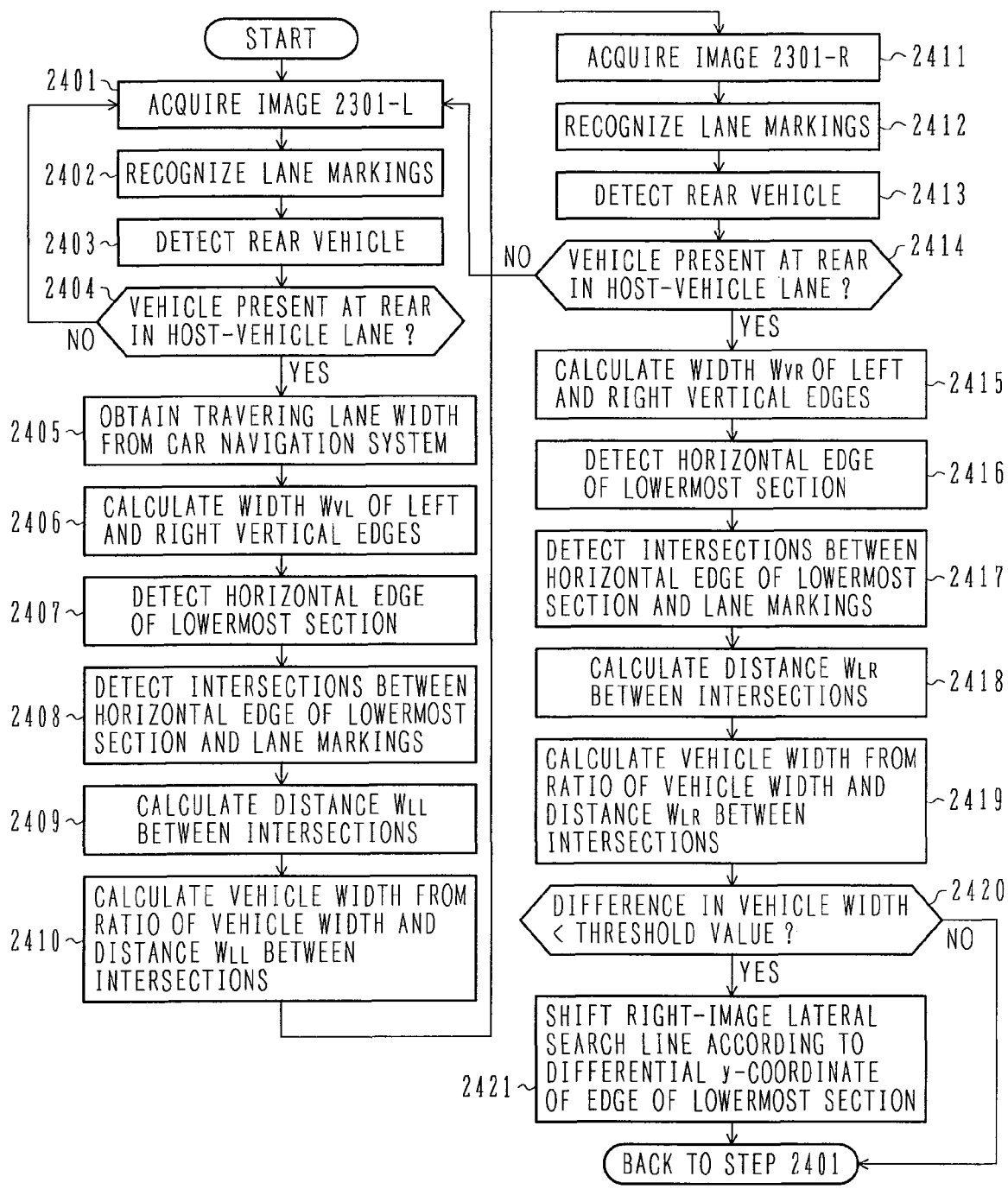
FIG. 24 shows a calibration process flow of the stereo camera unit 101.

An associated process flow is shown in FIG. 24. The steps shown in FIG. 16 are executed for the cameras 101-L and 101-R, and the shift in vertical position between the images is corrected according to a particular detection position of the vehicle. This is a basic process flow.

Steps 2401 to 2410 relate to the image 2310-L. Details of processing are substantially the same as in FIG. 16, and detailed description is omitted. After detection of the vehicle, width WVL in the image is calculated, then after recognition of lane markings, lane width WLL in the image is calculated, and the vehicle width is calculated from WVL and WLL.

Steps 2411 to 2419 relate to the image 2310-R. However, these steps are unnecessary since the lane width was already obtained in step 2405. The image 2310-R is also processed similarly: after detection of the vehicle, width WVR in the image is calculated, then after recognition of lane markings, lane width WLR in the image is calculated, and the vehicle width is calculated from WVR and WLR.

The vehicle widths that have thus been calculated are compared in step 2420. If a difference between both is equal to or smaller than a threshold value, the shift in a y-direction of the edge of the lowermost section of the vehicle in the differential image is calculated and the vertical position is corrected according to the calculated shift.

Figure 25:
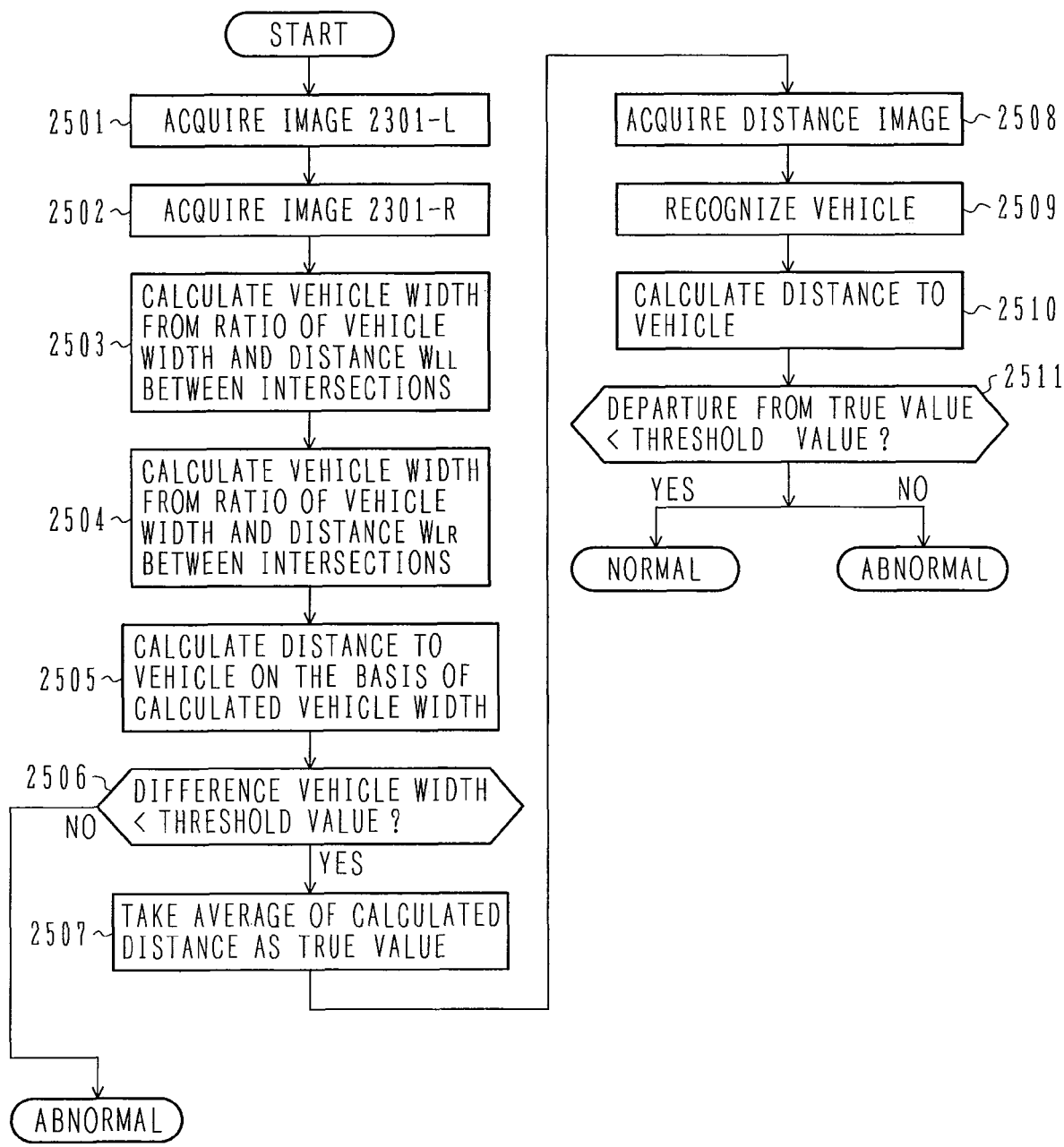
FIG. 25 shows a self-diagnosing process flow of the stereo camera unit 101.

In addition, self-diagnosing is possible if the distance to the vehicle, calculated from the distance image obtained in step 602, is compared with the distance calculated from the left and right camera images by use of the method shown in FIG. 24. An associated flowchart is shown in FIG. 25.

Steps 2501 and 2502 are executed to acquire the left and right camera images. Next, steps 2503 and 2504 are executed to calculate the distances to the vehicle in both images. This method is substantially the same as that shown in FIG. 24. Next, a difference between the calculated distances is evaluated in step 2506, and if the difference is equal to or smaller than a threshold value, an average value of the distances is taken as a true value of the distance to the vehicle in step 2507. A distance image is next acquired in step 2508. This may use a generally known method. Next, the distance image is used to recognize the vehicle in step 2509. The distance to the vehicle is calculated from the distance image in step 2510, and a difference from the true value that was set in step 2507 is evaluated in step 2511. The difference is judged to be normal if equal to or smaller than the threshold value, or abnormal if in excess of the threshold value.

Figure 18:
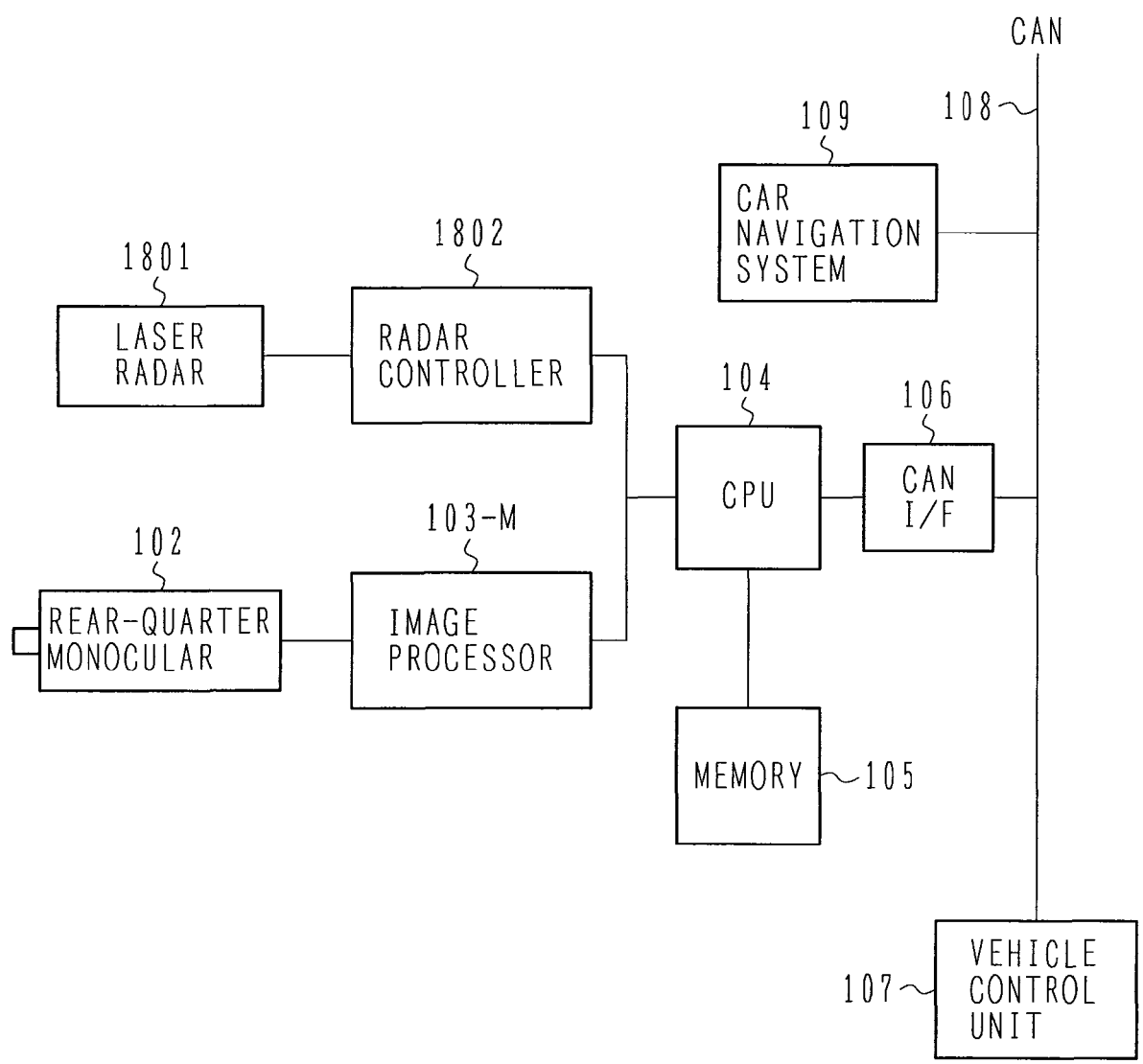
FIG. 18 shows a system configuration with a laser radar installed for rear monitoring.

FIG. 18 shows a configuration that uses a laser radar for rear monitoring. In this case, the laser radar 1801 is used instead of the stereo camera unit 101, and a radar control device 1802 is used to control the laser radar 1801. Other constituent elements are the same as those of the configuration described above. The laser radar 1801 can measure the distance to the moving obstacle and a bearing thereof. The radar can also measure the width of the obstacle.

Figure 19:
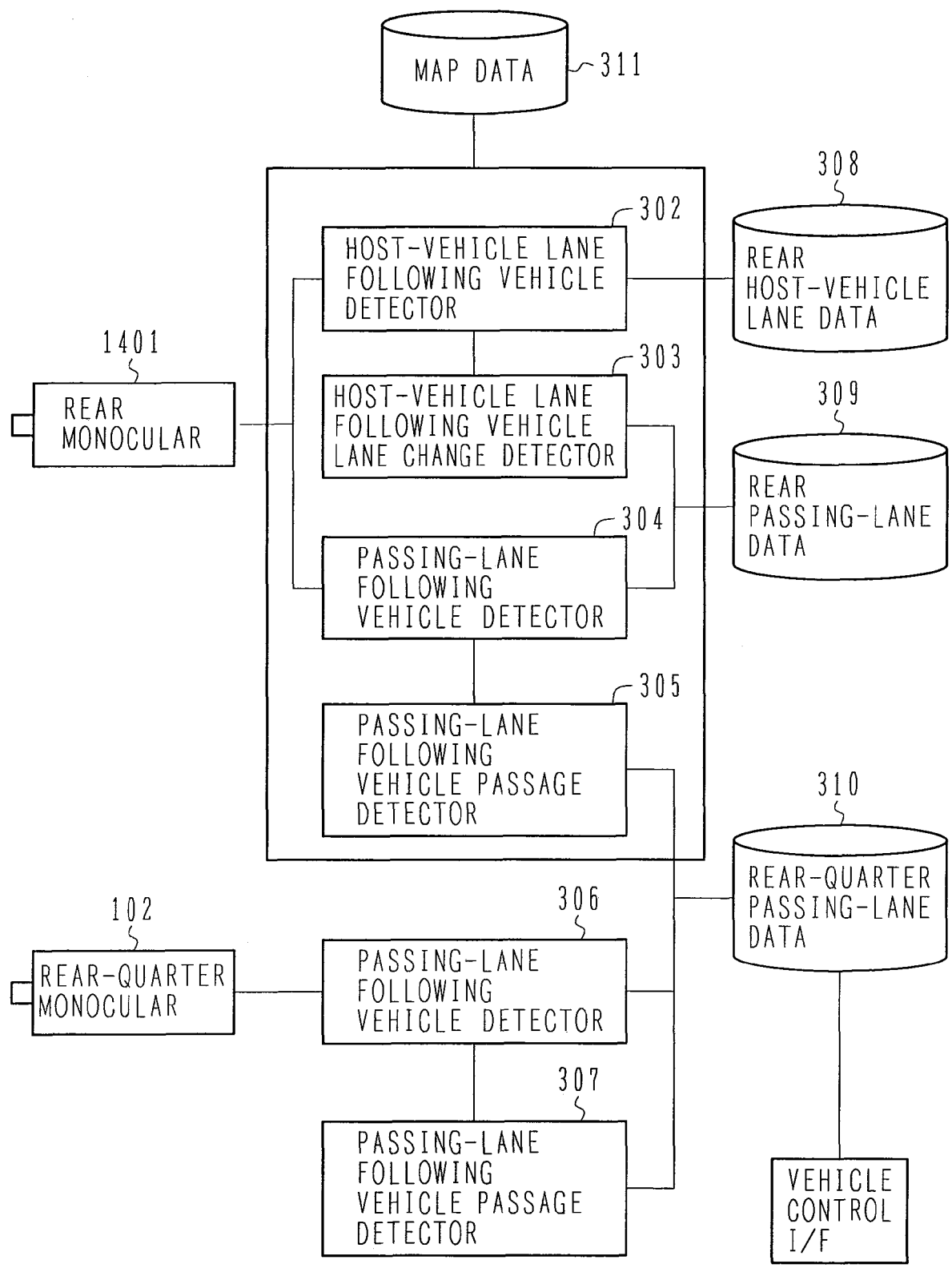
FIG. 19 shows a software configuration with the laser radar installed for rear monitoring.

FIG. 19 shows a software configuration that assumes the use of the laser radar 1801. In this case, although the recognition of lane markings cannot be used to detect vehicles present in each lane, since the bearing of the obstacle to be monitored can be measured, this bearing can be used to detect the vehicles in each lane. At this time, if the road on which the obstacle is traveling is curved, since the vehicles in each lane cannot be distinguished only by the bearing, road link information is obtained from the car navigation system 109 to discriminate in which lane the detected vehicle exists.

Figure 20:
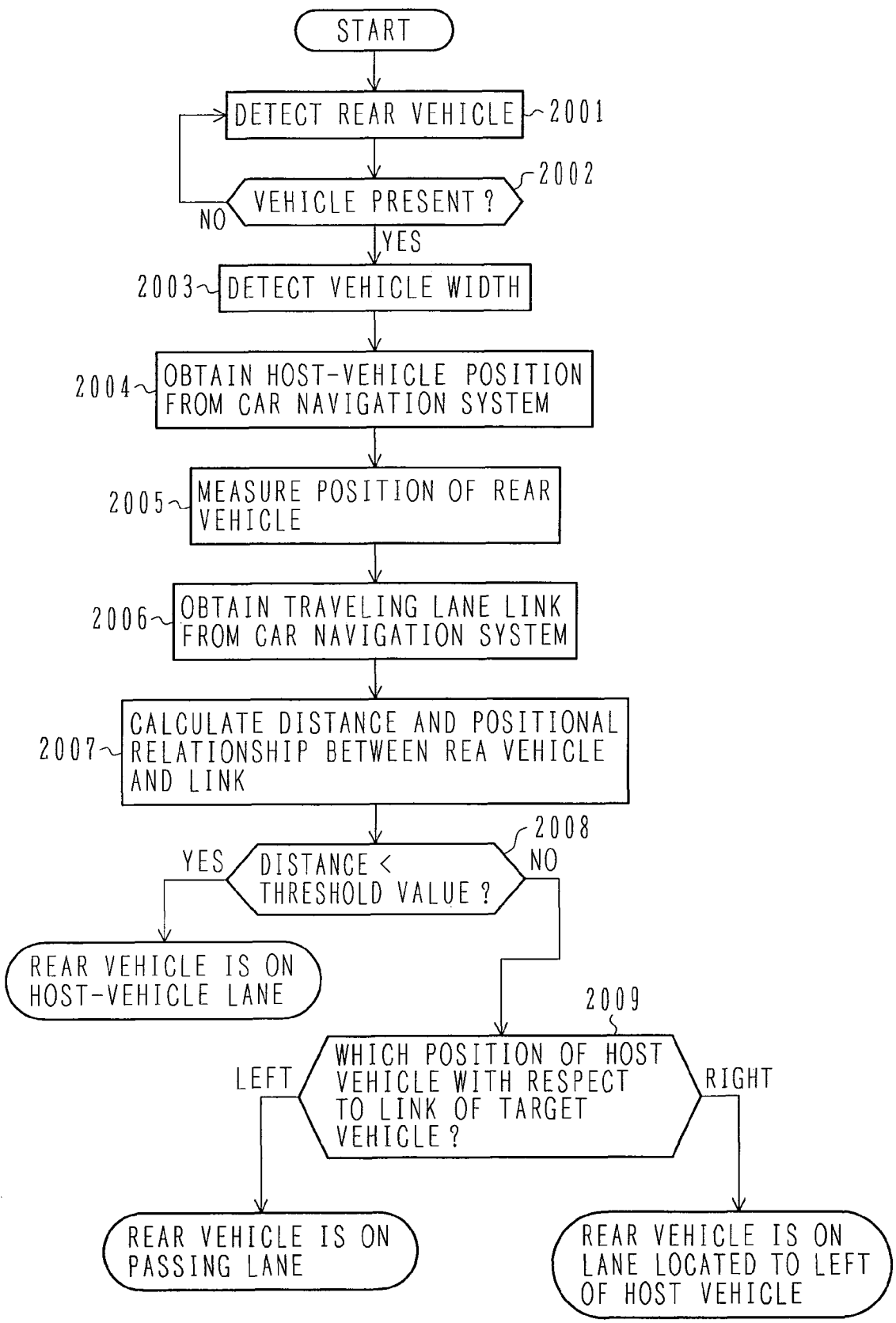
FIG. 20 shows a process flow applied when the laser radar is used for rear monitoring.

FIG. 20 shows a process flow that assumes the use of the laser radar 1801. First, rear vehicle detection is attempted in step 2001. Whether a vehicle exists is judged in step 2002, and if a vehicle is present, the vehicle width of the vehicle is detected in step 2003. Next, position information of the host vehicle is obtained from the car navigation system 109 in step 2004, and the position of the vehicle at rear is measured in step 2005. The distance to the target vehicle and the bearing thereof from the position of the host vehicle can be measured by the laser radar 1801, so the measured distance and bearing can be used to measure the position of the rear vehicle.

Next, information on the road link where the host vehicle is traveling is obtained from the car navigation system 109 in step 2006, and a relationship in relative position between the link and the target vehicle is derived in step 2007. First during this deriving operation, the distance between the link and the target vehicle is calculated and whether the calculated distance is less than a threshold value is judged in step 2008. If the distance is less than the threshold value, the target vehicle is regarded as traveling in the lane of the host vehicle. If the value is within the threshold, the lane is discriminated from the relationship in relative position between the link and the target vehicle, in step 2009. The lane is the passing lane if the target vehicle is on the left side when viewed from the host vehicle, or the lane on the left of the host vehicle if the target vehicle is on the right side.

The method disclosed herein presupposes accurateness of the host vehicle position and map information obtained from the car navigation system 109.

The examples disclosed hitherto in this document can be applied to not only rear monitoring, but also front monitoring. For example, when a front-monitoring stereo camera unit and/or a front-quarter monitoring camera is used, if the vehicle traveling in immediate front enters a lane adjacent to the traveling lane of the host vehicle, a driver thereof may not notice this or the vehicle in immediate front is likely to be hidden and concealed behind a front pillar of the host vehicle and enter a blind spot of the driver. Even in these cases, if the rear-monitoring technology disclosed hitherto in this document is applied to front monitoring, the distance to a vehicle traveling in a front-quarter direction, for example, can be detected and lane change assisting conducted in a like manner.

As described above, an obstacle detection system according to the present embodiment includes a stereo camera unit for detecting width and height of an immediately following vehicle, and a monocular camera for detecting a rear vehicle present on an adjoining lane. The system also includes a first image processor for processing images acquired by the stereo camera unit, a second image processor for processing an image acquired by the monocular camera, and a database for storage of vehicle feature quantities calculated during the vehicle detection with the first and second image processors. In addition, when the immediately following vehicle enters a passing lane, the first image processor calculates the feature quantities of the vehicle and registers the calculated feature quantities in the database, and the second image processor uses the feature quantities in order to calculate a distance to the vehicle imaged by the monocular camera.

Furthermore, the system has a stereo camera coverage passage discriminator that discriminates whether the vehicle that the monocular camera has detected is passing through a coverage of the stereo camera unit. If the vehicle is not passing through the coverage, the second image processor estimates dimensions of the detected vehicle from the registered feature quantities within the database and calculates the distance to the vehicle.

Moreover, the stereo camera coverage passage discriminator uses the database-stored feature quantities in order to calculate for trial a relative distance to the corresponding vehicle, and uses the calculated relative distance and a difference between the time when the feature quantities were registered in the database, and the time when the second image processor detected the vehicle, in order to judge whether the vehicle has the database-stored feature quantities. If the vehicle is judged to have the database-stored feature quantities, the stereo camera coverage passage discriminator judges the vehicle to have passed through the coverage of the host vehicle rear vehicle detector.

The first image processor and the second image processor each calculate an independent relative distance for trial from the data-stored feature quantities of the detected vehicle and actual feature quantities thereof. If a difference between the relative distances is less than a threshold value, the vehicle is judged to have the database-stored feature quantities, and as a result, data in the database is updated.

The database includes a host vehicle rear vehicle database for storing feature quantities of the host vehicle lane rear vehicle detected by the host vehicle rear vehicle detector, a first adjoining-lane rear vehicle database for storing feature quantities of the adjoining-lane rear vehicle detected by the host vehicle rear vehicle detector, and a second adjoining-lane rear vehicle database for storing feature quantities of the adjoining-lane rear vehicle detected by the monocular camera.

The database preferably retains vehicle width of the vehicle detected by the first or second image processor, a relative position of the detected vehicle to the host vehicle, detection time, relative speed of the detected vehicle, and vehicle width thereof in the image.

A direction of the monocular camera for detecting the rear vehicle at rear on an adjoining lane is estimated using vehicle width data of the vehicle imaged by the monocular camera, and the relative distance to the vehicle, calculated using the vehicle width data.

The first image processor recognizes on-road lane markings and uses a relationship in position between the lane markings and the detected vehicle in order to identify a lane in which the vehicle is traveling. The first image processor identifies the traveling lane of the vehicle from a left-right positional relationship between a gravitational center of the vehicle and the lane markings located to the left of the image. In addition, if the lane markings located to the left of the image cannot be recognized, positions and width of the lane markings located to the right of the image are used to judge that the vehicle is traveling in the adjoining lane of the host vehicle if a lateral position of the gravitational center of the vehicle exists at the left of the lane marking on the right side with a clearance equivalent to at least the lane width.

Images by both cameras of the stereo camera unit are processed, the width of the lane markings and that of the vehicle are calculated from the processed images, and the distances to the vehicle are derived from the calculated width data. If a differential distance is less than a threshold value, the detected vehicles in the images are judged to be the same vehicle, and camera parameters are determined from differential edge height of the lowermost sections of the detected vehicles in the images.

The vehicle rear monitoring device processes the images acquired by both cameras of the stereo camera unit, calculates the widths of the lane markings and the vehicle from the processed images, and uses calculated width data to calculate the distances to the vehicle. If a differential distance is less than a threshold value, a true value of the distance to the vehicle is set on the basis of the calculated distances and a comparison is conducted between a distance to the vehicle, obtained by processing a distance image, and the true value. Operation is judged to be normal if the differential distance is less than the threshold value, or abnormal if the differential distance is equal to or greater than the threshold value.

Another obstacle detection system according to the present embodiment includes a first monocular camera for detecting width and height of an immediately following vehicle, and a second monocular camera for detecting a rear vehicle present on an adjoining lane. The system also includes a first image processor for processing an image acquired by the first monocular camera, a second image processor for processing an image acquired by the second monocular camera, and a database for storage of vehicle feature quantities calculated during the vehicle detection with the first and second image processors. When the immediately following vehicle enters a passing lane, the first image processor calculates the feature quantities of the vehicle and registers the calculated feature quantities in the database, and the second image processor uses the feature quantities in order to calculate a distance to the vehicle imaged by the monocular camera.

The system further has a rear-monitoring camera coverage passage discriminator that discriminates whether the vehicle that the second monocular camera has detected is passing through a coverage of the first camera unit. If the vehicle is not passing through the coverage, the second image processor estimates dimensions of the detected vehicle from the registered feature quantities within the database and calculates the distance to the vehicle.

Furthermore, the first image processor detects lane markings on both sides of a current traveling lane of the host vehicle from the image that has been acquired by the first monocular camera. After the detection of the lane markings, the first image processor estimates the vehicle width of the imaged vehicle by using not only the vehicle width estimated from a distance between the lane markings and the kind of road on which the vehicle is traveling, but also the width of the vehicle in the image. The second image processor calculates a distance to the vehicle imaged by the second monocular camera, by using the vehicle width.

The first image processor and the second image processor both use the database-stored feature quantities and feature quantities of the detected vehicle to calculate for trial the relative distance to the corresponding vehicle independently. If a difference between the relative distances is less than a threshold value, the vehicle is judged to have the database-stored feature quantities, and as a result, data in the database is updated.

The database includes a host vehicle rear vehicle database for storing feature quantities of the host vehicle lane rear vehicle detected by a stereo camera unit, a first adjoining-lane rear vehicle database for storing feature quantities of the adjoining-lane rear vehicle detected by the stereo camera unit, and a second adjoining-lane rear vehicle database for storing feature quantities of the adjoining-lane rear vehicle detected by the monocular camera.

The database preferably retains vehicle width of the vehicle detected by the first or second image processor, a relative position of the detected vehicle to the host vehicle, detection time, relative speed of the detected vehicle, and vehicle width thereof in the image.

The first image processor recognizes on-road lane markings and uses a relationship in position between the lane markings and the detected vehicle in order to identify a lane in which the vehicle is traveling. The first image processor identifies the traveling lane of the vehicle from a left-right positional relationship between a gravitational center of the vehicle and the lane markings located to the left of the image. In addition, if the lane markings located to the left of the image cannot be recognized, positions and width of the lane markings located to the right of the image are used to judge that the vehicle is traveling in the adjoining lane of the host vehicle if a lateral position of the gravitational center of the vehicle exists at the left of the lane marking on the right side with a clearance equivalent to at least the lane width.

Yet another obstacle detection system according to the present embodiment includes a laser radar for detecting width and height of an immediately following vehicle, and a monocular camera for detecting a rear vehicle present on an adjoining lane. The system also includes a radar controller for processing laser radar data, an image processor for processing an image acquired by the monocular camera, and a database for storage of vehicle feature quantities calculated during the vehicle detection with the radar controller and the image processor. When the immediately following vehicle enters a passing lane, the radar controller calculates the feature quantities of the vehicle and registers the calculated feature quantities in the database, and the image processor uses the feature quantities in order to calculate a distance to the vehicle imaged by the monocular camera.

An absolute position of the detected vehicle is calculated from a relative position thereof and a position of the host vehicle, and a distance between the detected vehicle and a link constituting a road on which the host vehicle is traveling is calculated. If the distance is less than a threshold value, the detected vehicle is judged to be traveling in the same lane as that of the host vehicle. If the distance is equal to or greater than the threshold value, the lane in which the detected vehicle is traveling is judged from a positional relationship between the vehicle and the link.

Stored feature quantities within the database and feature quantities of the detected vehicle are used to calculate independent relative distances for trial, and if a difference between the relative distances is less than the threshold value, the detected vehicle is judged to have the feature quantities stored in the database, and as a result, data in the database is updated.

The database includes a host vehicle rear vehicle database for storing feature quantities of the host vehicle lane rear vehicle detected by the laser radar, a first adjoining-lane rear vehicle database for storing feature quantities of the adjoining-lane rear vehicle detected by the laser radar, and a second adjoining-lane rear vehicle database for storing feature quantities of the adjoining-lane rear vehicle detected by the monocular camera.

The database preferably retains vehicle width of the vehicle detected by the radar controller and the image processor, a relative position of the detected vehicle to the host vehicle, detection time, and relative speed of the detected vehicle.

In addition, vehicle width data of the vehicle imaged by the monocular camera, and the relative distance to the vehicle, calculated using the vehicle width data are used to estimate a direction of the monocular camera.

The vehicle width data of the vehicle imaged by the monocular camera for detecting the rear vehicle on an adjoining lane, and the relative distance to the vehicle, calculated using the vehicle width data are used to estimate the direction of the monocular camera.

Stereo cameras may be installed on the side mirrors of the host vehicle to monitor a rear-quarter region of the vehicle. This makes it possible to measure the distance to and relative speed of a vehicle approaching the host vehicle from the rear-quarter region thereof.

In that case, however, the distance and the relative speed may not be accurate enough, since installing the stereo cameras on the side mirrors requires making the cameras more compact and since the base-line length of the cameras decreases with the dimensions of the cameras.

It is ideal monitoring to cover all directions around the host vehicle. Implementing this, however, requires installing a number of sensors in and on the vehicle and consequently increases costs. Costs can be held down by minimizing the number of sensors, but in the end, a blind spot is likely to occur that makes none of the sensors able to detect vehicles, and the vehicles that have entered the blind spot cannot be detected.

According to the present embodiment, it is possible to save costs and accurately detect obstacles present around the host vehicle, and hence to contribute to preventive safety control of vehicles. The embodiment can contribute particularly to assisting in a lane change of the host vehicle, by monitoring the rear of a desired lane and confirming that an approaching vehicle is not present.

What is claimed is:

1. An obstacle detection apparatus comprising:
   a first processor which processes results of recognition with a first sensor;
   a second processor which processes results of recognition with a second sensor;
   an arithmetic unit constructed such that by analyzing the recognition results which has been processed by said first processor, said arithmetic unit calculates a width of an obstacle present in a coverage of the first sensor and stores the calculated feature quantities into a storage device, and such that when the obstacle moves from the coverage of the first sensor to a coverage of the second sensor, said arithmetic unit calculates a relative distance of the obstacle, from the feature quantities of the obstacle which have been stored into the storage device, and from the desired feature quantities of the obstacle which have been obtained by analyzing the recognition results of the second sensor, processed by said second processor; and
   an interface unit for outputting the relative distance data acquired by said arithmetic unit.

2. The obstacle detection apparatus according to claim 1, wherein:
   said first processor processes an image detected by a stereo camera which images a rear region of a vehicle;
   said second processor processes an image detected by a monocular camera which images a rear-quarter region of the vehicle; and
   said arithmetic unit is constructed such that by analyzing the image which has been processed by said first processor, said arithmetic unit calculates vehicle width of a following vehicle present in a coverage of the stereo camera and stores the calculated vehicle width into a storage device, and such that when the following vehicle moves from the coverage of the stereo camera to a coverage of the monocular sensor, said arithmetic unit calculates a distance between the following vehicle and host vehicle, from the vehicle width of the following vehicle which has been stored into the storage device, and from the vehicle width of the following vehicle which has been obtained by analyzing the image processed by said second processor.

3. The obstacle detection apparatus according to claim 2, wherein:
   if said arithmetic unit judges that the vehicle detected by the monocular camera is a vehicle which has not passed through the coverage of the stereo camera, said arithmetic unit calculates the distance between the following vehicle and the host vehicle, from feature quantities of the following vehicle which have been obtained from the image processed by said second processor.

4. The obstacle detection apparatus according to claim 2, wherein:
   said arithmetic unit calculates the distance between the following vehicle and the host vehicle, from feature quantities of the following vehicle which have been obtained from the image processed by said first or second processor, and if a differential distance is less than a threshold value, said arithmetic unit judges that the following vehicle is the same as the vehicle having the feature quantities stored within the storage device, and updates the feature quantities stored within the storage device.

5. The obstacle detection apparatus according to claim 2, wherein:
   the storage device retains at least either the vehicle width of the vehicle detected by said first processor, the vehicle width of the vehicle detected by said second processor, a relative position to the host vehicle, detection time, a relative speed, or the vehicle width in the image.

6. The obstacle detection apparatus according to claim 2, wherein:
   said arithmetic unit includes a host vehicle lane following vehicle detector which detects the following vehicle present in the same lane as that of the host vehicle, by analyzing the image processed by said first processor, a first passing-lane following vehicle detector which detects a following vehicle present in a passing lane for the same lane as that of the host vehicle, by analyzing the image processed by said first processor, and a second passing-lane following vehicle passage detector which defects the following vehicle present in the passing lane, by analyzing the image processed by said second processor.

7. The obstacle detection apparatus according to claim 6, wherein:
   said arithmetic unit includes a lane markings recognizer to recognize a lane marking on a road by analyzing the image processed by said first processor, and recognizes the traveling lane of the following vehicle by a position of gravitational center thereof on a screen and a relative position of the lane marking recognized by the lane markings recognizer.

8. The obstacle detection apparatus according to claim 1, wherein
   said first processor processes an image detected by said first sensor imaging a rear region of a vehicle, and
   said second processor processes an image detected by said second sensor imaging a rear-quarter region of the vehicle.

9. The obstacle detection apparatus according to claim 1, wherein
   said first sensor is a stereo camera, and
   said second sensor is a monocular camera.

10. An obstacle detection apparatus, comprising:
    a first processor processing an image detected by a first monocular camera imaging a rear region of a vehicle;

a second processor processing an image detected by a second monocular camera imaging a rear-quarter region of a vehicle;

an arithmetic unit for analyzing said image processed by said first processor to calculates a vehicle width or height of a following vehicle present within a coverage of the first monocular camera, storing said vehicle width or height into a storage device, calculating a distance between said following vehicle and a host vehicle on the basis of said following vehicle width or vehicle height stored in said storage device and said following vehicle width or height calculated by analyzing said image processed by said second processor when said following vehicle moves from a coverage of the first monocular camera to a coverage of the second monocular sensor; and an interface unit for outputting said relative distance data acquired by said arithmetic unit.

11. The obstacle detection apparatus according to claim 10, wherein:

said arithmetic unit detects a current traveling lane of the host vehicle from the image acquired by the first monocular camera, estimates vehicle width of the vehicle by using not only the vehicle width estimated from both a distance between the lane markings and the kind of road on which the vehicle is traveling, but also width of the vehicle in the image thereof; and said second image processor calculates a distance to the vehicle in the image of the second monocular camera by using the vehicle width.

* * * * *